United States Patent
Shimizu et al.

(10) Patent No.: US 12,552,232 B2
(45) Date of Patent: Feb. 17, 2026

(54) VEHICLE DOOR DEVICE

(71) Applicant: AISIN CORPORATION, Kariya (JP)

(72) Inventors: Jueru Shimizu, Kariya (JP); Yosuke Kaji, Kariya (JP); Yusuke Kajino, Kariya (JP); Manabu Murai, Kariya (JP)

(73) Assignee: AISIN CORPORATION, Kariya (JP)

( * ) Notice: Subject to any disclaimer, the term of this patent is extended or adjusted under 35 U.S.C. 154(b) by 370 days.

(21) Appl. No.: 18/451,480

(22) Filed: Aug. 17, 2023

(65) Prior Publication Data

US 2024/0075794 A1 Mar. 7, 2024

(30) Foreign Application Priority Data

Sep. 2, 2022 (JP) .................................. 2022-140099
Jul. 3, 2023 (JP) .................................. 2023-109327

(51) Int. Cl.
*B60J 5/04* (2006.01)
*E05D 15/10* (2006.01)
*E05F 15/63* (2015.01)

(52) U.S. Cl.
CPC ............ *B60J 5/047* (2013.01); *E05D 15/101* (2013.01); *E05F 15/63* (2015.01)

(58) Field of Classification Search
CPC .......... B60J 5/047; E05F 15/63; E05D 15/101
See application file for complete search history.

(56) References Cited

U.S. PATENT DOCUMENTS

| 4,703,585 A * | 11/1987 | Koch ..................... E05D 15/101 |
| | | 49/223 |
| 12,420,725 B2 * | 9/2025 | Kogure ................ B60R 16/027 |
| 2022/0185079 A1 | 6/2022 | Sumiya |
| 2023/0212903 A1 * | 7/2023 | Kume ................... E05F 15/649 |
| | | 296/146.9 |
| 2025/0283364 A1 * | 9/2025 | Wallander ............... E05D 15/32 |

FOREIGN PATENT DOCUMENTS

| JP | 2006-90097 A | 4/2006 |
| JP | 2007-191922 A | 8/2007 |
| JP | 2008-163693 A | 7/2008 |
| JP | 2022-92327 A | 6/2022 |

* cited by examiner

*Primary Examiner* — Faye M Fleming
(74) *Attorney, Agent, or Firm* — Oblon, McClelland, Maier & Neustadt, L.L.P.

(57) ABSTRACT

A vehicle door device includes first and second link arms each including a first pivotal connection point to a vehicle body and a second pivotal connection point to a door of a vehicle, and a drive unit that opens and closes the door based on an operation of a link mechanism formed by the first and second link arms by using at least one of the first and second link arms as a drive link and pivoting the drive link. The drive unit includes an actuator that outputs drive torque, and a transmission mechanism that transmits the drive torque to the drive link disposed at a position separated from the actuator. The transmission mechanism includes a torque input portion that inputs the drive torque to the drive link, and a power transmission member that forms a transmission path for the drive torque in a state of extending between the actuator and the torque input portion and has flexibility to enable transmission of the drive torque in a bent state.

10 Claims, 21 Drawing Sheets

FIG.13 FULLY CLOSED STATE

FIG. 14 FULLY OPENED STATE

VEHICLE DOOR DEVICE

CROSS REFERENCE TO RELATED APPLICATIONS

This application is based on and claims priority under 35 U.S.C. § 119 to Japanese Patent Application 2022-140099, filed on Sep. 2, 2022 and Japanese Patent Application 2023-109327, filed on Jul. 3, 2023, the entire content of which is incorporated herein by reference.

TECHNICAL FIELD

This disclosure relates to a vehicle door device.

BACKGROUND DISCUSSION

In the related art, there is a vehicle door device provided with first and second link arms having a first pivotal connection point with respect to a vehicle body and a second pivotal connection point with respect to a door of a vehicle. In such a vehicle door device, a door provided at a door opening portion is opened and closed based on the operation of a link mechanism formed by the first and second link arms. For example, in JP 2006-90097A (Reference 1), a configuration is described in which each of these link arms is housed at a position outside a door opening attached to an end portion of a vehicle body side portion and inside a weather strip attached to a vehicle interior side of the door.

In addition, in the vehicle, more power and electrification are promoted for many in-vehicle equipment. As for the door device using the link mechanism as described above, an optimum design of a drive unit including a disposition thereof is also sought.

SUMMARY

According to an aspect of this disclosure, there is provided a vehicle door device including first and second link arms each including a first pivotal connection point to a vehicle body and a second pivotal connection point to a door of a vehicle, and a drive unit that opens and closes the door based on an operation of a link mechanism formed by the first and second link arms by using at least one of the first and second link arms as a drive link and pivoting the drive link, in which the drive unit includes an actuator that outputs drive torque, and a transmission mechanism that transmits the drive torque to the drive link disposed at a position separated from the actuator, and the transmission mechanism includes a torque input portion that inputs the drive torque to the drive link, and a power transmission member that forms a transmission path for the drive torque in a state of extending between the actuator and the torque input portion and has flexibility to enable transmission of the drive torque in a bent state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

A first embodiment embodying a vehicle door device will be described below with reference to the drawings.

Link Mechanism

Figure 1:
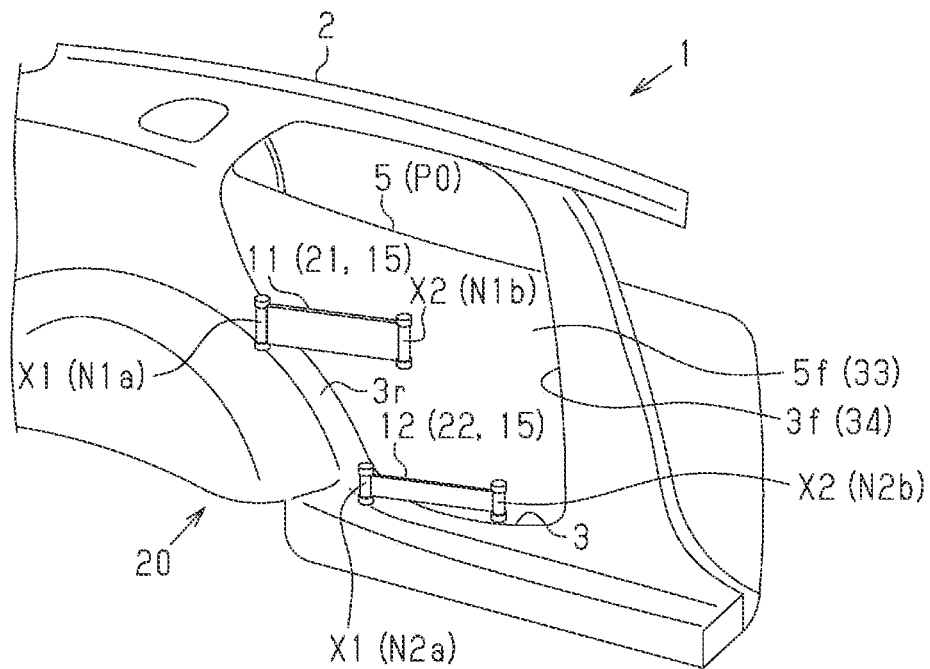
FIG. 1 is a perspective view of a door device.
Figure 2:
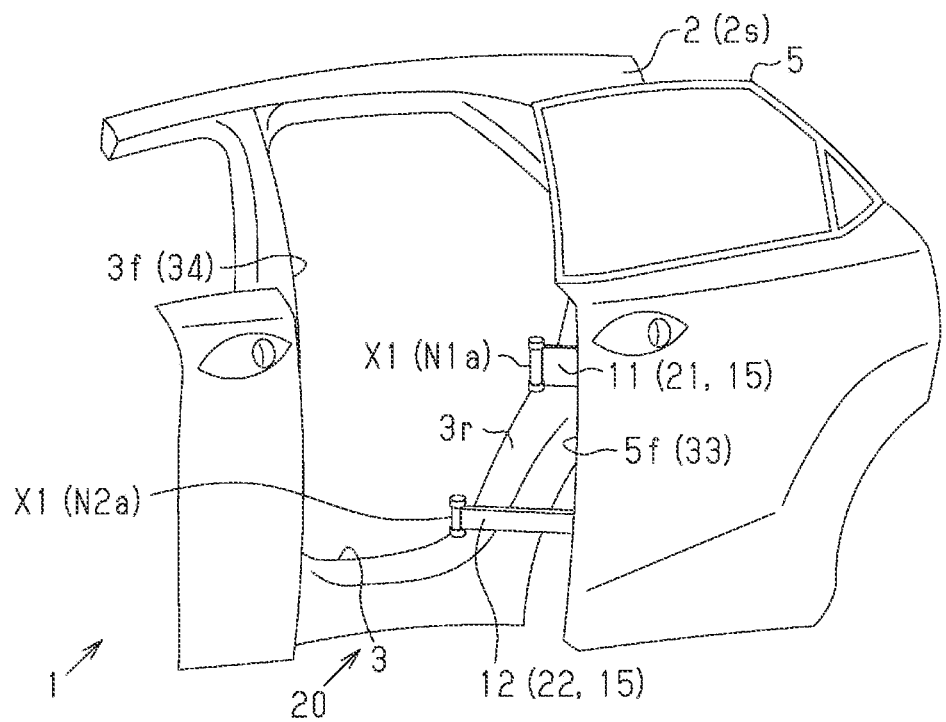
FIG. 2 is a perspective view of the door device.

As illustrated in FIGS. 1 and 2, a vehicle 1 of the present embodiment is provided with a door opening portion 3 provided on a side surface 2s of a vehicle body 2. The door opening portion 3 is provided with a first link arm 11 and a second link arm 12 for supporting a door 5 of the vehicle 1 to the door opening portion 3.

Specifically, in the vehicle 1 of the present embodiment, each of these first and second link arms 11 and 12 has a first pivotal connection point X1 with respect to the vehicle body 2 and a second pivotal connection point X2 with respect to the door 5. Specifically, the first link arm 11 is connected to the vehicle body 2 while being pivotally supported by a support shaft N1$a$ extending in the vertical direction (vertical direction in each drawing), and is connected to the door 5 while being pivotally supported by a support shaft N1$b$ extending in the vertical direction. The second link arm 12 is also connected to the vehicle body 2 while being pivotally supported by a support shaft N2$a$ extending in the vertical direction, and is connected to the door 5 while being pivotally supported by a support shaft N2$b$ extending in the vertical direction.

That is, as illustrated in FIGS. 3 to 6, in the vehicle 1 of the present embodiment, these first and second link arms 11 and 12 form a link mechanism 15 configured as a four-joint link. The vehicle 1 of the present embodiment is configured such that the door 5 supported by the door opening portion 3 opens and closes based on the operation of the link mechanism 15.

More specifically, as illustrated in FIGS. 1 and 2, the vehicle 1 of the present embodiment uses these first and second link arms 11 and 12 to support the door 5 to the door opening portion 3 on the rear side of the vehicle (left side in FIG. 1 and right side in FIG. 2). In the vehicle 1 of the present embodiment, each of these first and second link arms 11 and 12 has the first pivotal connection point X1 pivotably connected to the vehicle body 2 in the vicinity of a rear edge portion 3r of the door opening portion 3. In the vehicle 1 of the present embodiment, these first and second link arms 11 and 12 are disposed to be separated from each other in the vertical direction.

In the vehicle 1 of the present embodiment, the first link arm 11 is provided above the second link arm 12. In addition, the first link arm 11 has the second pivotal connection point X2 pivotably connected to the door 5 at a substantially center position of the door 5 in the front-rear direction. On the other hand, the second link arm 12 has the second pivotal connection point X2 connected to the door 5 in the vicinity of a front end portion 5f of the door 5. As a result, in the vehicle 1 of the present embodiment, the door device 20 is formed such that the door 5 opens and closes based on the operation of the link mechanism 15 formed by the first and second link arms 11 and 12.

Operation of Link Mechanism

Specifically, as illustrated in FIGS. 3 to 6, in the door device 20 of the present embodiment, when the door 5 is opened, each of the first and second link arms 11 and 12 pivots counterclockwise in each drawing around the first pivotal connection point X1. As a result, the door 5 of the vehicle 1 supported by these first and second link arms 11 and 12 opens toward the rear side of the vehicle (left side in each drawing).

In addition, in the door device 20 of the present embodiment, when the door 5 is closed, each of the first and second link arms 11 and 12 pivots clockwise in each drawing around the first pivotal connection point X1. As a result, the door 5 of the vehicle 1 supported by these first and second link arms 11 and 12 is configured to close toward the front side of the vehicle (right side in each drawing).

Figure 3:
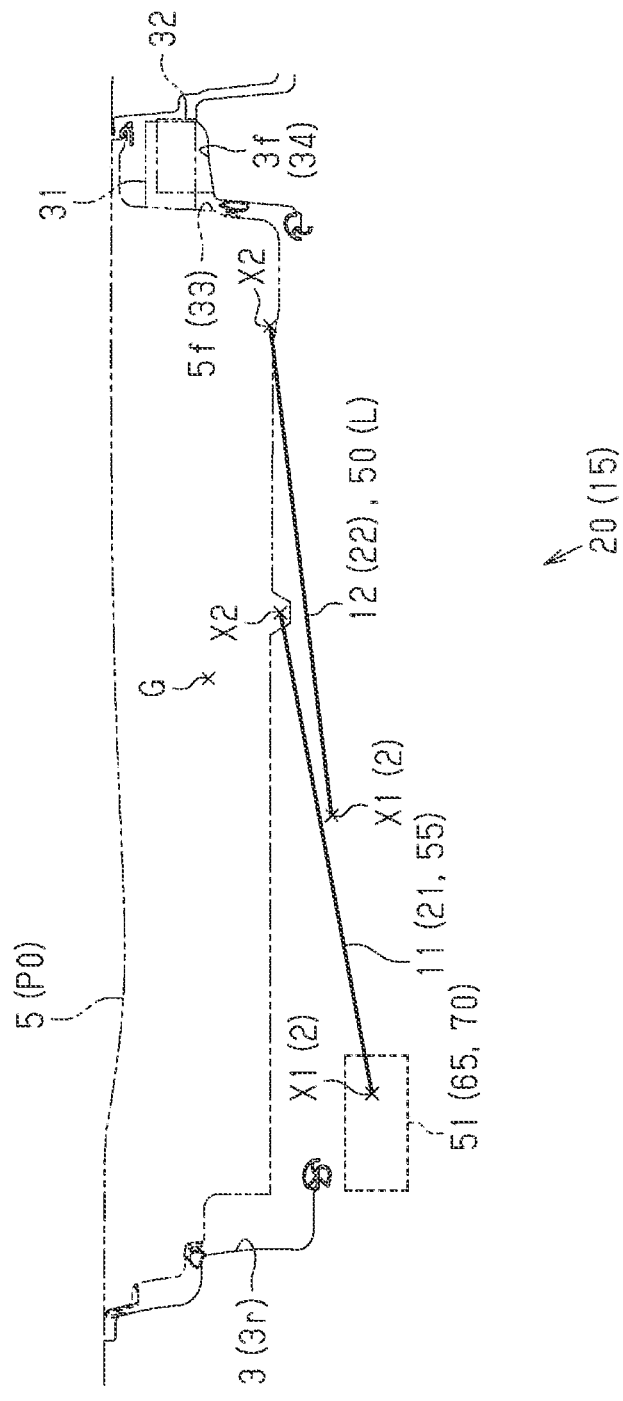
FIG. 3 is a plan view of first and second link arms forming a link mechanism.
Figure 4:
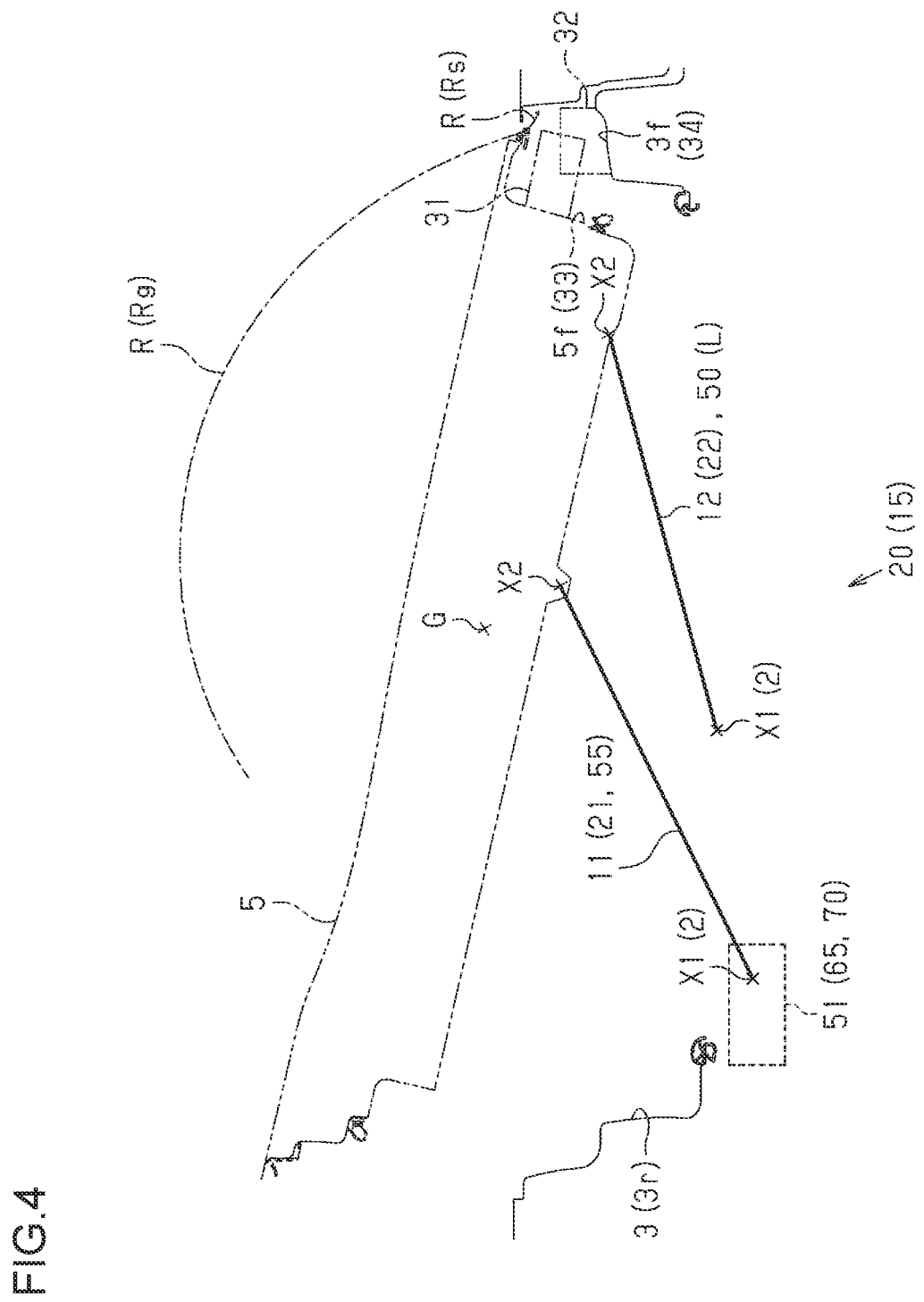
FIG. 4 is a plan view of the first and second link arms forming the link mechanism.
Figure 5:
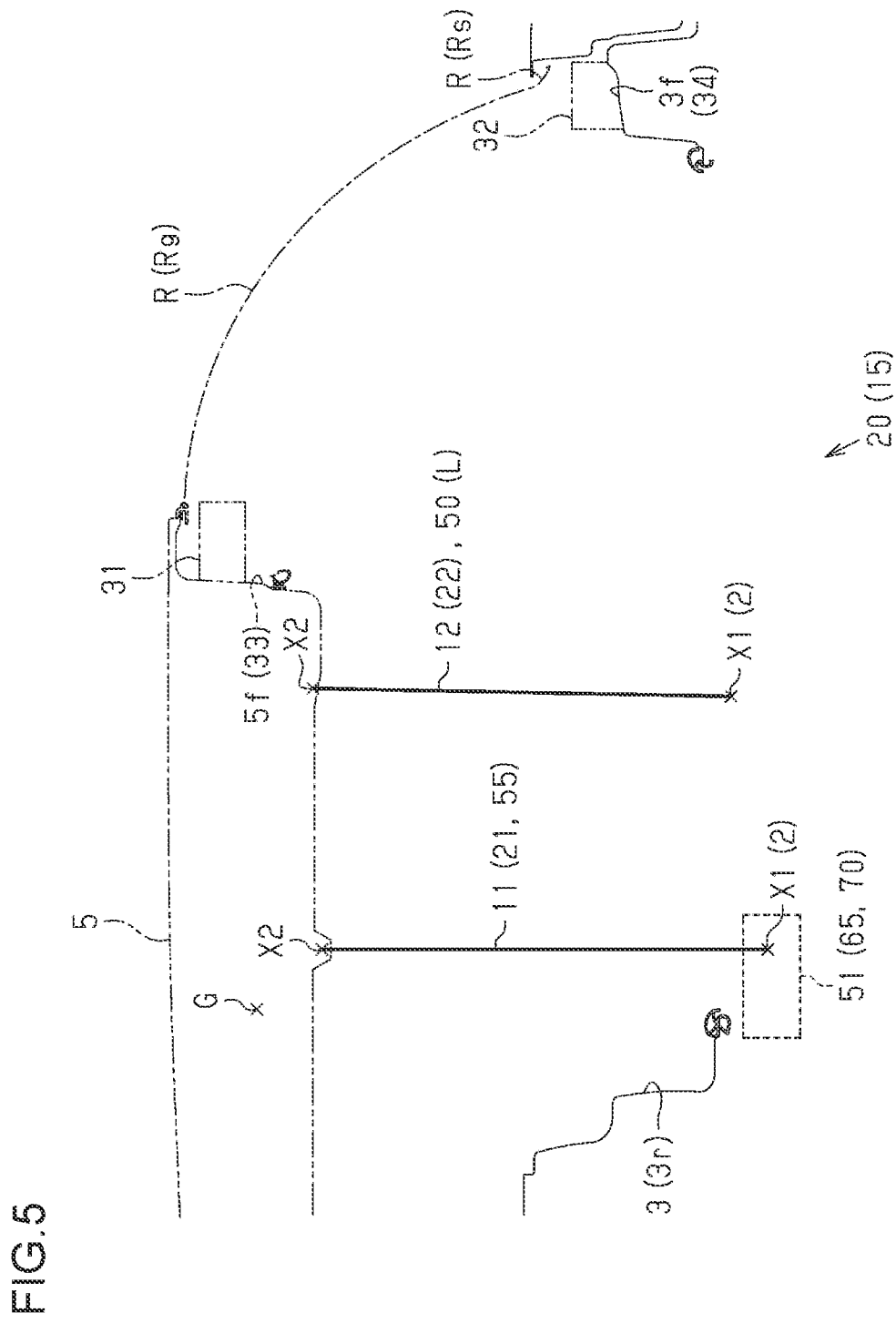
FIG. 5 is a plan view of the first and second link arms forming the link mechanism.
Figure 6:
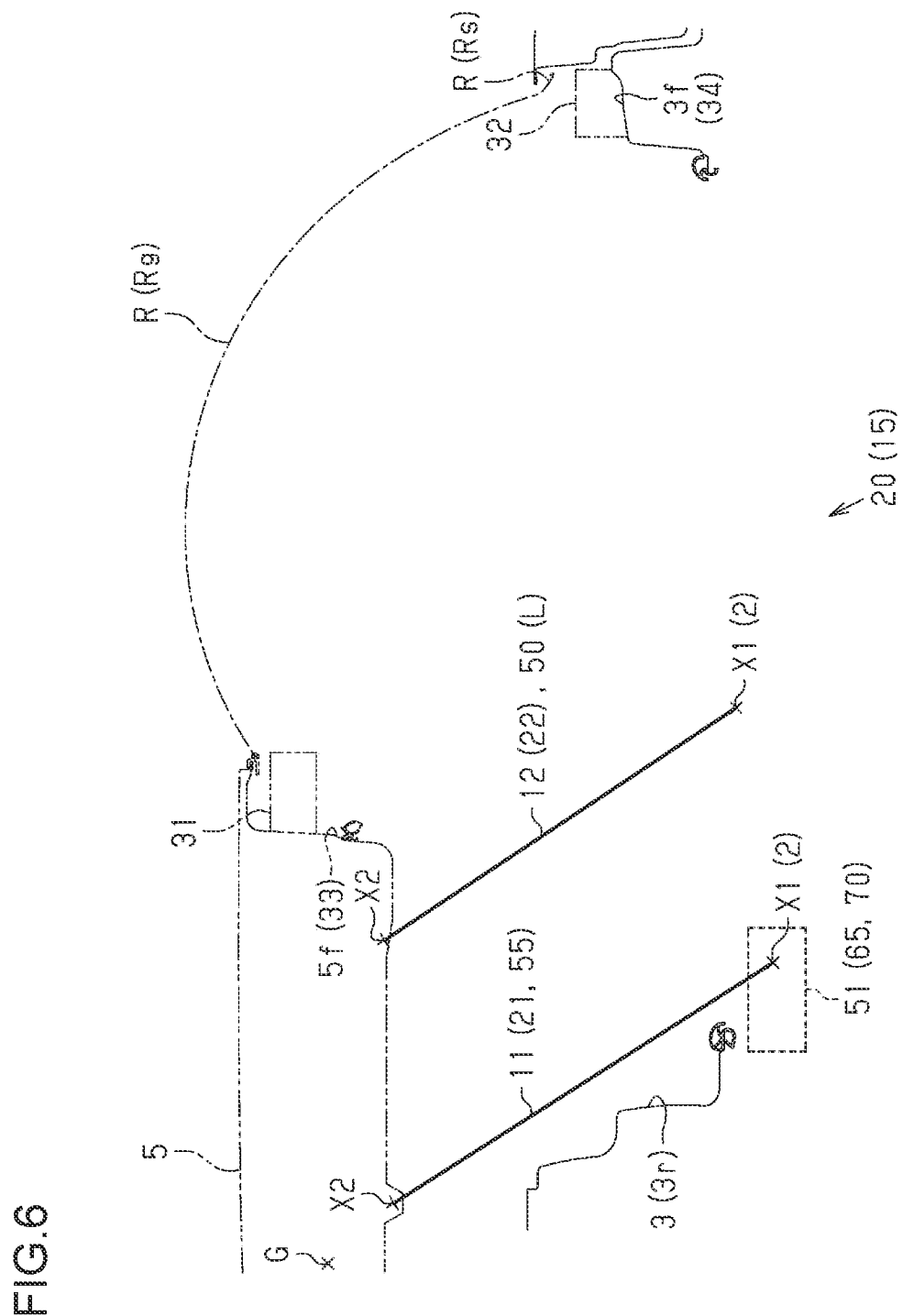
FIG. 6 is a plan view of the first and second link arms forming the link mechanism.

Furthermore, in the door device 20 of the present embodiment, an opening and closing operation trajectory R of the door 5 is defined so as to draw an arcuate trajectory Rg based on the operation of the link mechanism 15 formed by the first and second link arms 11 and 12. That is, as illustrated in FIG. 5, at an intermediate position where the first and second link arms 11 and 12 extend in the vehicle width direction (vertical direction in FIGS. 3 to 6), the movement component in the vehicle front-rear direction increases. As illustrated in FIGS. 3 and 4, as the opening and closing position of the door 5 is closer to a fully closed position P0, the first and second link arms 11 and 12 extend in the vehicle front-rear direction (left-right direction in FIGS. 3 to 6), so that the movement component in the vehicle width direction increases.

In addition, in the door device 20 of the present embodiment, the first link arm 11 has a second pivotal connection point X2 with respect to the door 5 at a position closer to the center of gravity G than the second link arm 12. That is, as a result, in the door device 20 of the present embodiment, the first link arm 11 is positioned on a main link 21 that supports a larger door load. The second link arm 12 is positioned at a sub-link 22 on which the door load acting thereon is relatively small.

In the door device 20 of the present embodiment, the first link arm 11 has a larger outer shape than the second link arm 12. As a result, the door device 20 of the present embodiment is configured to impart high support rigidity to the first link arm 11 positioned on the main link 21 thereof.

Door Side Engaging Portion and Vehicle Body Side Engaging Portion

In addition, as illustrated in FIGS. 3 to 7, the door device 20 of the present embodiment is provided with a door side engaging portion 31 provided at the front end portion 5f of the door 5 and a vehicle body side engaging portion 32 provided at a front edge portion 3f of the door opening portion 3. That is, in the vehicle 1 of the present embodiment, the door side engaging portion 31 is provided at a closed side end portion 33 located on the closing operation side of the door 5 that opens and closes the door opening portion 3 of the vehicle 1 based on the operation of the link mechanism 15 formed by the first and second link arms 11 and 12. Furthermore, the vehicle body side engaging portion 32 is provided at a closed side end portion 34 of the door opening portion 3 where the closed side end portion 33 of the door 5 contacts and separates, that is, approaches or separates based on the opening and closing operation of the door 5 moving in the vehicle front-rear direction. The door device 20 of the present embodiment is configured such that the door side engaging portion 31 and the vehicle body side engaging portion 32 are engaged with each other in a state where the door 5 is in the vicinity of the fully closed position P0.

Specifically, the door side engaging portion 31 of the present embodiment is provided with a shaft-like engaging portion 41 extending in the vertical direction of the vehicle 1 (in FIG. 7, the direction perpendicular to the paper surface) as a guide engaging portion. In the door device 20 of the present embodiment, the shaft-like engaging portion 41 as the guide engaging portion is configured as a roller 41x rotatably and pivotally supported around a support shaft (not illustrated) extending in the vertical direction. Furthermore, the vehicle body side engaging portion 32 is provided with a guide groove 42 having a pair of side wall portions 42a and 42b facing each other in the vehicle width direction (vertical direction in FIG. 7) and extending in the opening and closing direction of the door 5. In the door device 20 of the present embodiment, in a case where the door 5 is in the vicinity of the fully closed position P0, in the state where the shaft-like engaging portion 41 constituting the guide engaging portion is disposed in the guide groove 42, the door side engaging portion 31 and the vehicle body side engaging portion 32 are configured to engage with each other.

That is, the shaft-like engaging portion 41 of the door side engaging portion 31 is disposed in the guide groove 42 of the vehicle body side engaging portion 32 while being interposed between the pair of side wall portions 42a and 42b facing each other in the vehicle width direction, so that the displacement of the door 5 in the vehicle width direction is regulated. As a result, the door device 20 of the present embodiment can support the door 5 stably even in the vicinity of the fully closed position P0 where the first and second link arms 11 and 12 forming the link mechanism 15 are likely to be aligned.

Variable Connection Length Mechanism

In addition, as illustrated in FIGS. 3 to 6, in the door device 20 of the present embodiment, the second link arm 12 having positioning as the sub-link 22 is provided with a variable connection length mechanism 50 that can change the connection length L between the first and second pivotal connection points X1 and X2. Furthermore, this variable connection length mechanism 50 is biased in a direction to shorten the length between the first and second pivotal connection points X1 and X2, that is, the connection length L of the door 5 by the second link arm 12 provided with the variable connection length mechanism 50. As a result, the door device 20 of the present embodiment is configured such that the door 5 opens and closes while the connection length L of the second link arm 12 is shortened.

Figure 7:
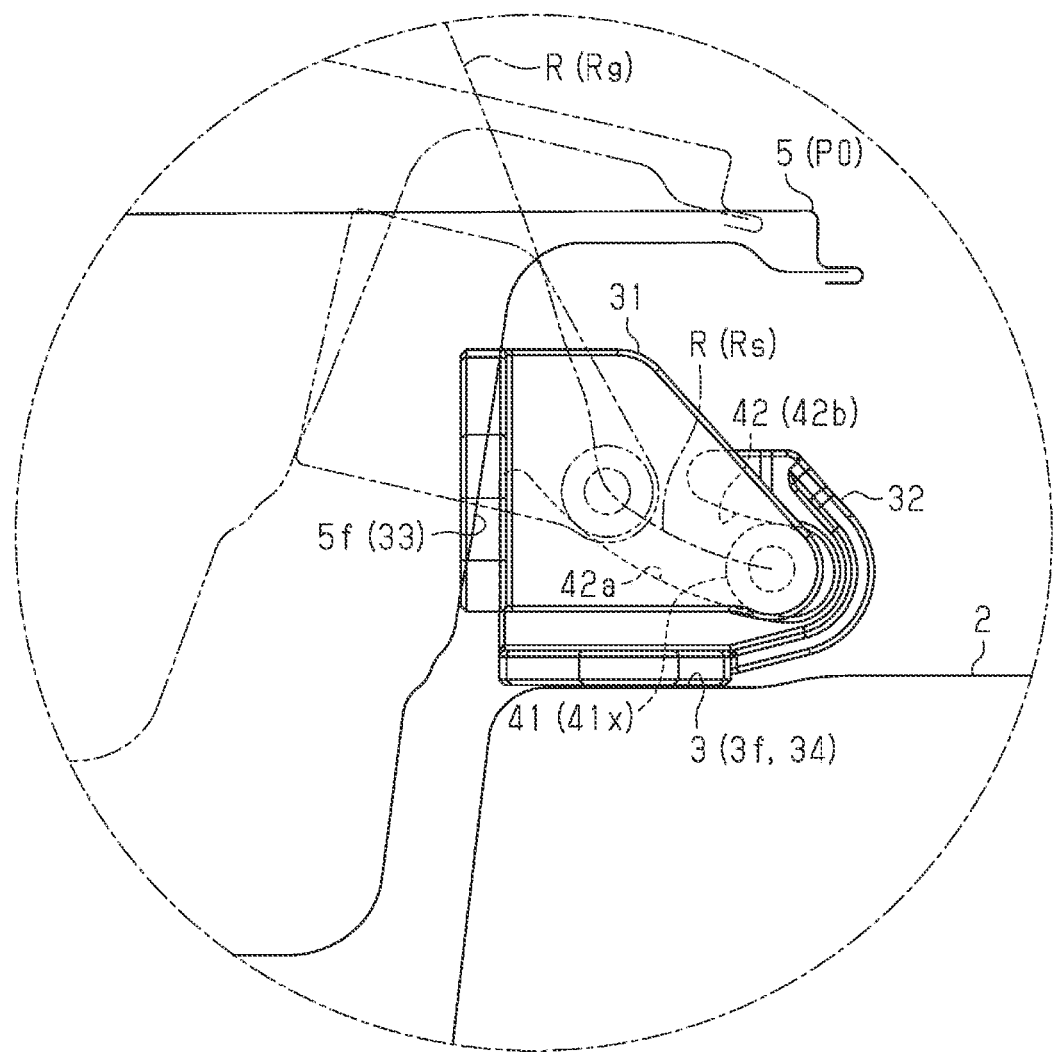
FIG. 7 is a schematic configuration diagram of a door side engaging portion and a vehicle body side engaging portion.
Figure 8:
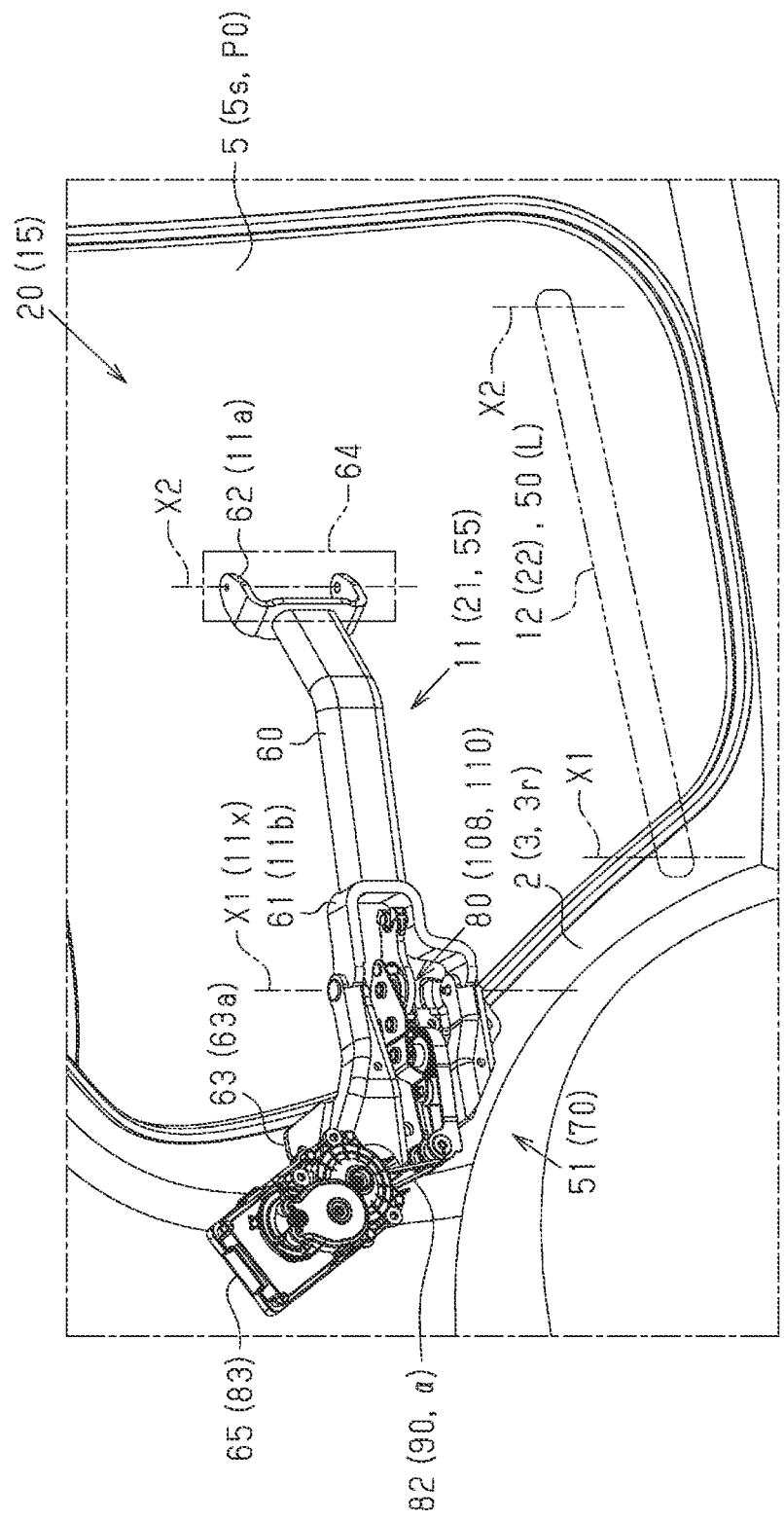
FIG. 8 is a perspective view of the first link arm and a drive unit positioned on a drive link.
Figure 9:
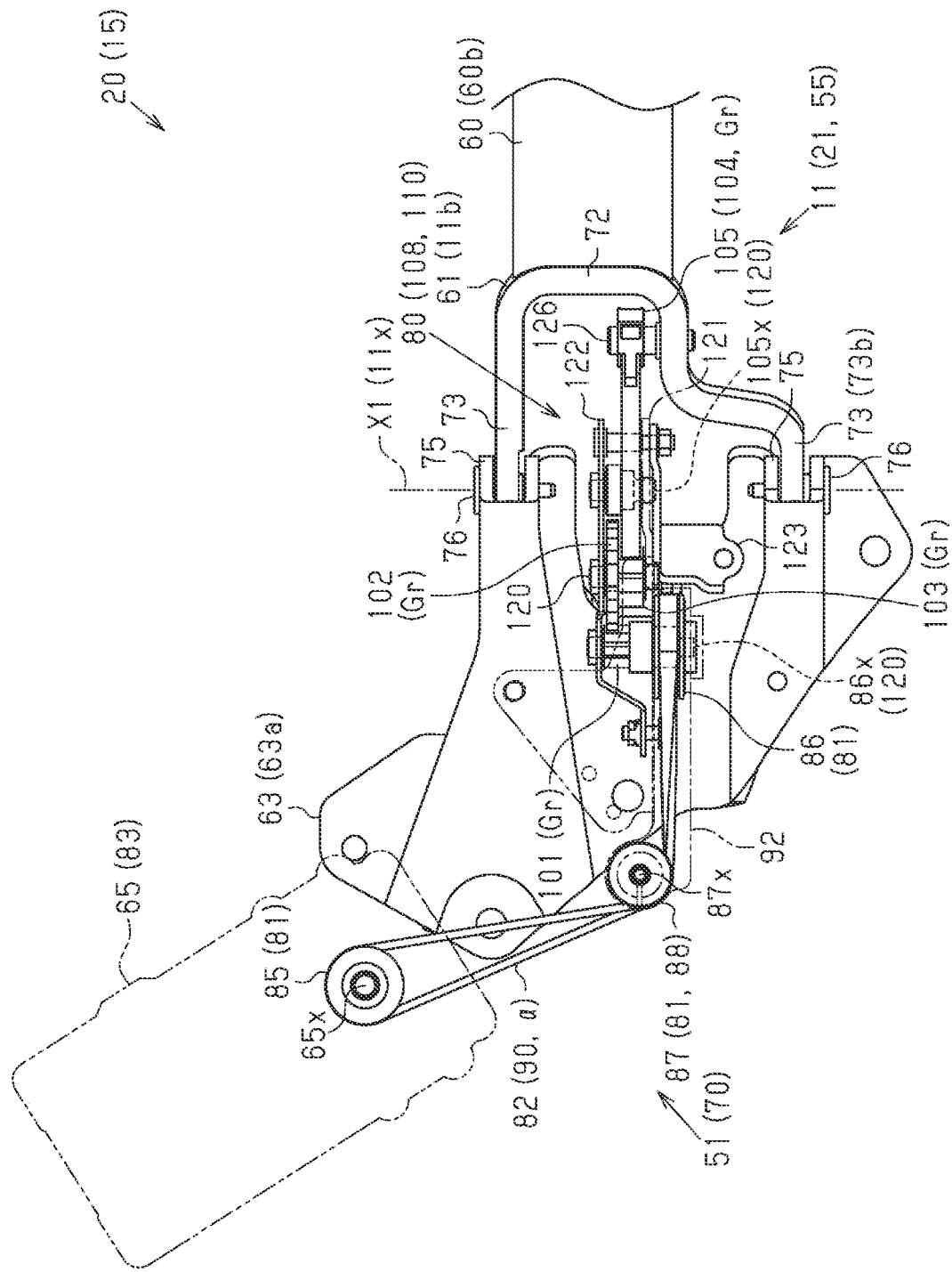
FIG. 9 is a front view of the first link arm and the drive unit positioned on the drive link.
Figure 10:
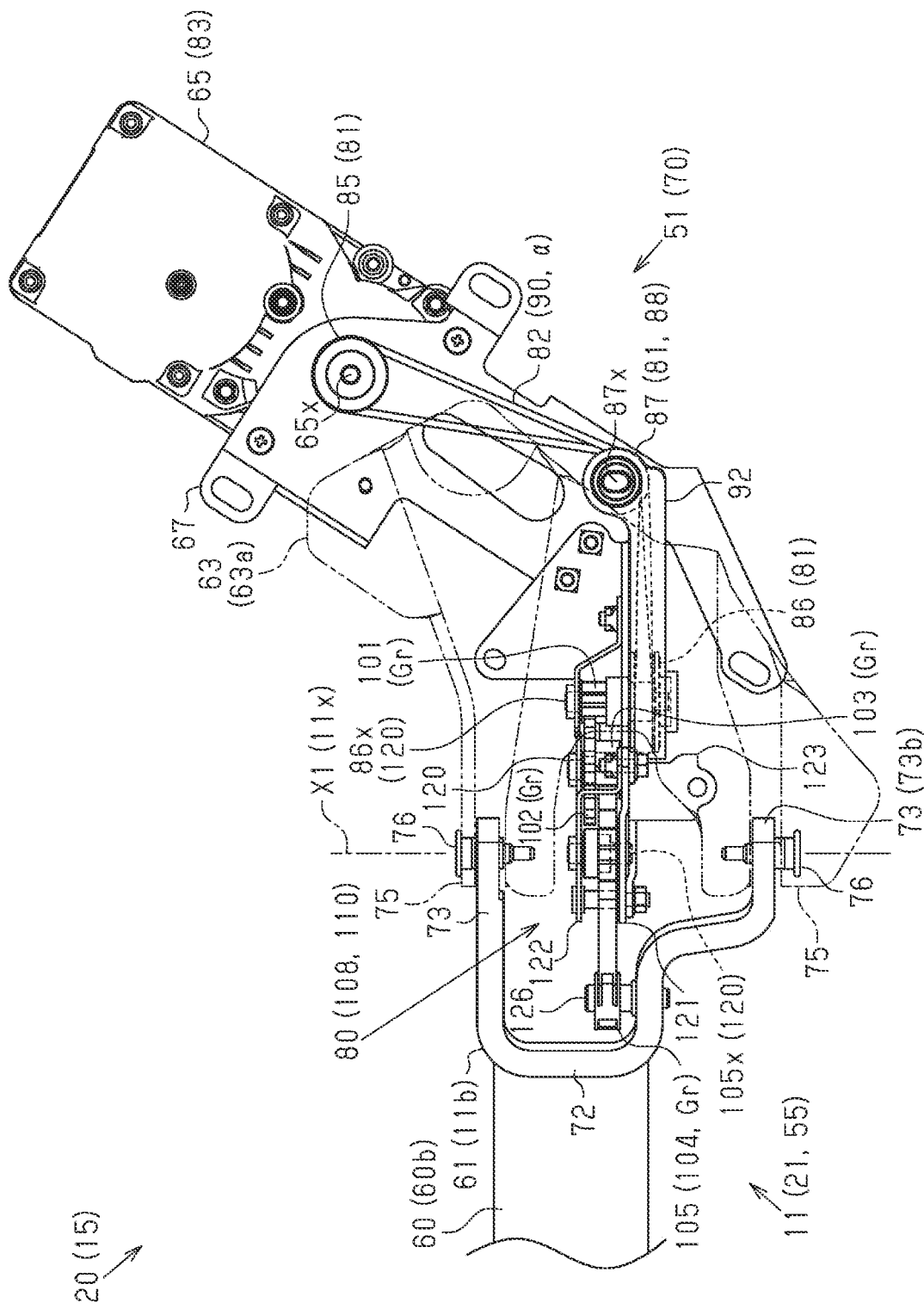
FIG. 10 is a rear view of the first link arm and the drive unit positioned on the drive link.
Figure 11:
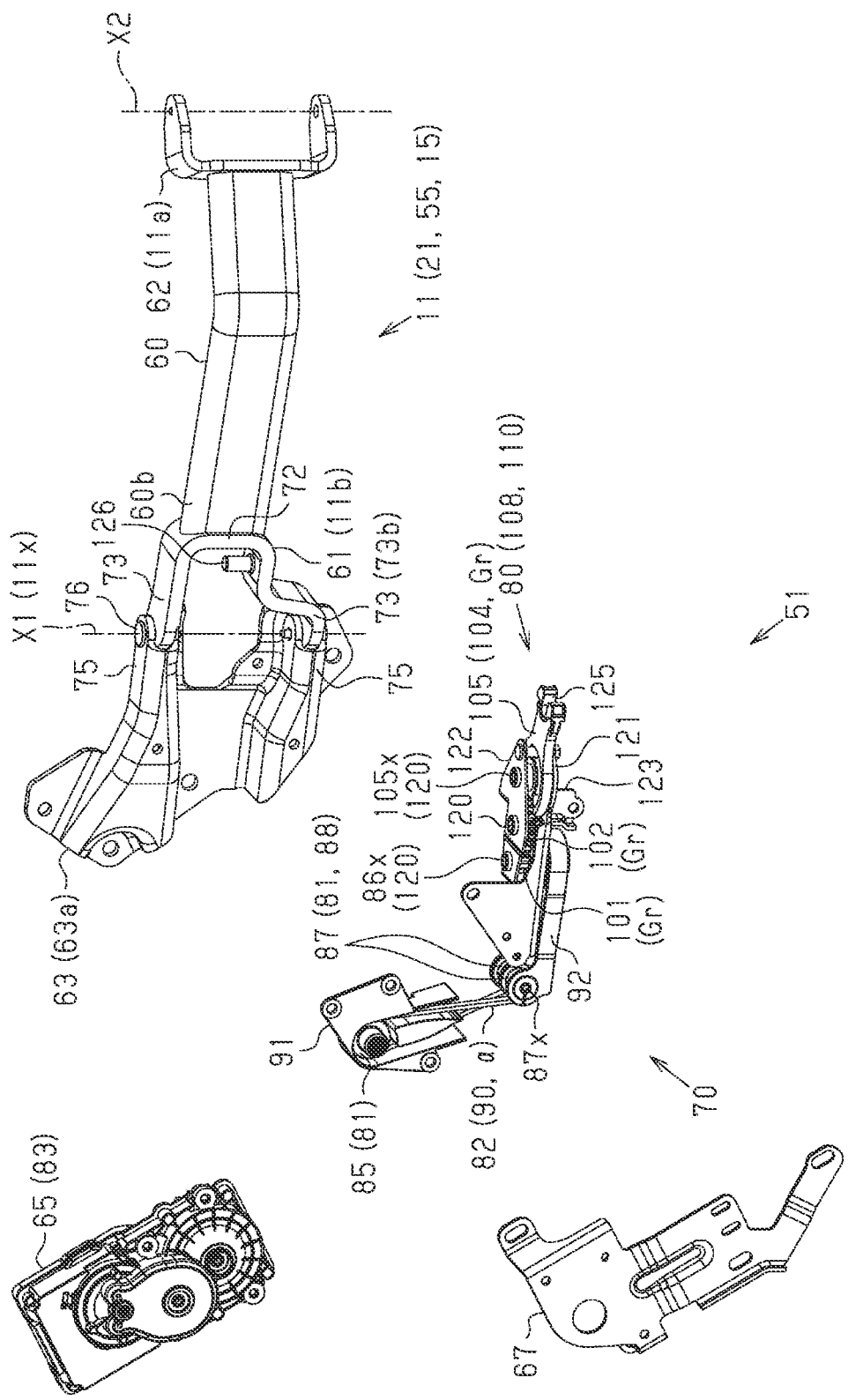
FIG. 11 is an exploded perspective view of the first link arm and the drive unit positioned on the drive link.

In addition, as illustrated in FIGS. 3, 4, and 7, in the door device 20 of the present embodiment, the opening and closing operation of the door 5 is allowed in a state where the door side engaging portion 31 and the vehicle body side engaging portion 32 are engaged with each other based on the operation of the variable connection length mechanism 50 provided on the second link arm 12. Specifically, when the door 5 is opened and closed while the door side engaging portion 31 and the vehicle body side engaging portion 32 are engaged with each other, the shaft-like engaging portion 41 is relatively displaced along the extending direction of the guide groove 42 while the connection length L is changed based on the operation of the variable connection length mechanism 50. As a result, in the door device 20 of the present embodiment, the opening and closing operation trajectory R of the door 5 changes.

That is, in the door device 20 of the present embodiment, when the door 5 moves to the fully closed position P0, the door side engaging portion 31 is engaged with the vehicle body side engaging portion 32, so that the opening and closing operation of the door 5 is guided in a state where the shaft-like engaging portion 41 is disposed in the guide groove 42. As a result, in the door device 20 of the present embodiment, the arcuate trajectory Rg based on the operation of the link mechanism 15 is configured to change to a linear trajectory Rs along the opening width direction of the door opening portion 3.

Specifically, in the door device 20 of the present embodiment, when the door 5 is fully closed, in a state where the door side engaging portion 31 and the vehicle body side engaging portion 32 are engaged with each other, an operating force in the closing direction is applied to the door 5. In the door device 20 of the present embodiment, the operating force for opening and closing the door 5 is assumed to be the driving force of a drive unit described later or a manual operation by the user. Furthermore, in this case, the variable connection length mechanism 50 provided on the second link arm 12 is operated based on the operating force in the closing direction, so that the connection length L of the door 5 by the second link arm 12 is extended based on the engagement state between the door side engaging portion 31 and the vehicle body side engaging portion 32. As a result, the door device 20 of the present embodiment is configured such that the door 5 supported by the link mechanism 15 is closed toward the fully closed position P0 in an aspect that draws the linear trajectory Rs as described above.

In addition, in a case where the door 5 is opened from the fully closed position P0, in a state where the door side engaging portion 31 and the vehicle body side engaging portion 32 are engaged with each other, an operating force in the opening direction is applied to the door 5. Furthermore, in this case, by operating the variable connection length mechanism 50 based on the operating force in the opening direction, the connection length L of the door 5 by the second link arm 12 is shortened based on the engagement state between the door side engaging portion 31 and the vehicle body side engaging portion 32. As a result, the door device 20 of the present embodiment is configured such that the door 5 supported by the link mechanism 15 opens from the fully closed position P0 in an aspect that similarly draws the linear trajectory Rs.

Drive Unit

As illustrated in FIGS. 8 to 11, the door device 20 of the present embodiment is provided with a drive unit 51 that opens and closes the door 5 of the vehicle 1 supported by the link mechanism 15 formed by the first and second link arms 11 and 12. In the door device 20 of the present embodiment, the drive unit 51 applies drive torque to the first link arm 11 with the first link arm 11 positioned on the main link 21 as a drive link 55. As a result, the drive unit 51 of the present embodiment is configured to pivot the first link arm 11 around the first pivotal connection point X1 with respect to the vehicle body 2 to open and close the door 5 supported by the first link arm 11.

Specifically, in the door device 20 of the present embodiment, the first link arm 11 is provided with an arm body 60 having an elongated and substantially bar-shaped outer shape. In addition, the first link arm 11 of the present embodiment is provided with a base end bracket 61 and a distal end bracket 62 that are connected to the end portions of the arm body 60 in the longitudinal direction. Furthermore, the door device 20 of the present embodiment is provided with a vehicle body bracket 63 to which the base end bracket 61 of the first link arm 11 is pivotably connected while being fixed in the vicinity of the rear edge portion 3r of the door opening portion 3. The door device 20 of the present embodiment is provided with a door bracket 64 to which the distal end bracket 62 of the first link arm 11 is pivotably connected while being fixed to the inner surface 5s of the door 5.

That is, in the door device 20 of the present embodiment, the base end bracket 61 and the vehicle body bracket 63, which are relatively pivotably connected, form the first pivotal connection point X1 on the first link arm 11. Furthermore, the distal end bracket 62 and the door bracket 64, which are also relatively pivotably connected, form the second pivotal connection point X2 on the first link arm 11. As a result, the drive unit 51 of the present embodiment is configured to input the drive torque to the base end portion 11b of the first link arm 11 pivotably supported with respect to the vehicle body 2.

More specifically, the drive unit 51 of the present embodiment is provided with an actuator 65 that outputs drive torque using a motor (not illustrated) as a driving source, and a transmission mechanism 70 that transmits the drive torque at a position separated from the actuator 65. As a result, the door device 20 of the present embodiment has a configuration in which the actuator 65 of the drive unit 51 can be disposed at a position separated from the base end portion 11b of the first link arm 11 to which the drive torque is input.

Specifically, in the door device 20 of the present embodiment, the base end bracket 61 constituting the base end portion 11b of the first link arm 11 is provided with a base portion 72 that is fixed to the base end 60b of the arm body 60 while extending in the vertical direction. In addition, the base end bracket 61 is provided with a pair of connecting portions 73 and 73 extending from the upper end and the lower end of the base portion 72 in the direction where the arm body 60 extends. The vehicle body bracket 63 fixed to the vehicle body 2 at the rear edge portion 3r of the door opening portion 3 also is provided with a pair of connecting portions 75 and 75 facing each other at positions separated in the vertical direction.

Furthermore, in the door device 20 of the present embodiment, each of the connecting portions 73 and 73 of the base end bracket 61 and each of the connecting portions 75 and 75 of the vehicle body bracket 63 are pivotably connected via connecting pins 76 and 76, respectively. As a result, the door device 20 of the present embodiment is configured such that the rotation shaft 11x of the first link arm 11 with respect to the vehicle body 2, that is, the first pivotal connection point X1 is formed.

Drive Torque Transmission Mechanism

In addition, as illustrated in FIGS. 9 to 14, the drive unit 51 of the present embodiment is provided with, as a transmission mechanism 70, a torque input portion 80 that inputs drive torque to the base end bracket 61 constituting the base end portion 11b of the first link arm 11, more specifically, to the connecting portion 73b on the lower side thereof. In the door device 20 of the present embodiment, the torque input portion 80 is disposed at a position inside the substantially U-shape formed by the base portion 72 of the base end bracket 61 and both connecting portions 73 and 73. In addition, the actuator 65 of the present embodiment is disposed at a position separated from the torque input portion 80 while being held by a holding bracket 67 provided independently of the vehicle body bracket 63. Furthermore, the drive unit 51 of the present embodiment is provided with a plurality of pulleys 81 rotatably and pivotally supported. The transmission mechanism 70 of the present embodiment is configured to transmit the drive torque of the actuator 65 provided at the separated position to the torque input portion 80 via a drive belt 82 wound around each of these pulleys 81.

Specifically, the holding bracket 67 of the present embodiment supports the held actuator 65 in a region called a so-called deck side trim on the rear edge portion 3r of the door opening portion 3 behind the vehicle body bracket 63 and above the upper end portion 63a. In addition, the actuator 65 of the present embodiment has a configuration as a so-called geared motor in which a motor (not illustrated) serving as a driving source and a speed reducer are housed in a case 83 having a flat and substantially rectangular box-like outer shape. Furthermore, the actuator 65 is provided with an output shaft 65x provided on one end side of the case 83 in the longitudinal direction and in an aspect penetrating the case 83 in the thickness direction. The drive unit 51 of the present embodiment is provided with a drive pulley 85 that rotates integrally with the output shaft 65x based on the drive torque output by the actuator 65.

In addition, the drive unit 51 of the present embodiment is provided with a driven pulley 86 provided in the torque input portion 80. In the transmission mechanism 70 of the present embodiment, the drive torque of the actuator 65 is transmitted to the torque input portion 80 by rotationally driving the annular shape of the drive belt 82 wound around the drive pulley 85 and the driven pulley 86.

Drive Belt and Pulley

More specifically, the drive unit 51 of the present embodiment is provided with a pair of intermediate pulleys 87 and 87 around which the drive belt 82 is wound at a position between the drive pulley 85 and the driven pulley 86. As a result, in the transmission mechanism 70 of the present embodiment, the drive belt 82 interposed between the actuator 65 and the torque input portion 80 forms a transmission path a of the drive torque extending in a substantially L shape when viewed from the vehicle width direction (refer to FIGS. 9 and 10).

Specifically, in the drive unit 51 of the present embodiment, the driven pulley 86 provided in the torque input portion 80 includes a support shaft 86x extending in the vertical direction of the vehicle 1, similar to the rotation shaft 11x of the first link arm 11 constituting the drive link 55. In addition, the actuator 65 of the present embodiment is supported by the vehicle body 2 in a state where the output shaft 65x extends in the vehicle width direction (in FIGS. 9 and 10, the direction perpendicular to the paper surface). Furthermore, the intermediate pulleys 87 and 87 disposed between the drive pulley 85 and the driven pulley 86 rotating integrally with the output shaft 65x also include a common support shaft 87x extending in the vehicle width direction. The transmission mechanism 70 of the present embodiment is configured such that the drive belt 82 is wound around each of the intermediate pulleys 87 and 87 in a bent state.

That is, the annular shape of the drive belt 82 wound around the drive pulley 85 and the driven pulley 86 and rotationally driven forms two long side portions 82x and 82x extending in the direction where the actuator 65 and the torque input portion 80 are separated from each other. Furthermore, in the drive unit 51 of the present embodiment, each of the long side portions 82x and 82x is wound around each of the intermediate pulleys 87 and 87 arranged side by side in the vehicle width direction from below. As a result, the transmission mechanism 70 of the present embodiment is configured to transmit the drive torque in a state where the drive belt 82 is bent, with each of the intermediate pulleys 87 and 87 as an abutment member 88.

That is, the drive belt 82 as a flexible power transmission member 90 is wound around the pulley 81 while being bent in the thickness direction. Furthermore, the drive belt 82 can be rotationally driven while maintaining the annular shape even in a state where each of the long side portions 82x and 82x formed between the pulleys 81 and 81 separated from each other is twisted. Using this fact, the transmission mechanism 70 of the present embodiment routes the drive belt 82 along the rear edge portion 3r of the door opening portion 3 where the actuator 65 and the torque input portion 80 are provided. Based on the twist of the drive belt 82, it is configured to absorb the "twisted positional relationship" set between the output shaft 65x of the actuator 65 provided with the drive pulley 85 and the support shaft 86x of the driven pulley 86 provided in the torque input portion 80 thereof.

The drive unit 51 of the present embodiment is provided with a cover member 91 forming a routing path 91x for the drive belt 82 in the vicinity of the actuator 65. In addition, the drive unit 51 is provided with a cover member 92 forming a routing path 92x for the drive belt 82 between the driven pulley 86 and each of the intermediate pulleys 87 and 87. The drive unit 51 of the present embodiment is configured such that one end of the cover member 92 supports the support shaft 87x of each of the intermediate pulleys 87 and 87.

Torque Input Portion

Figure 12:
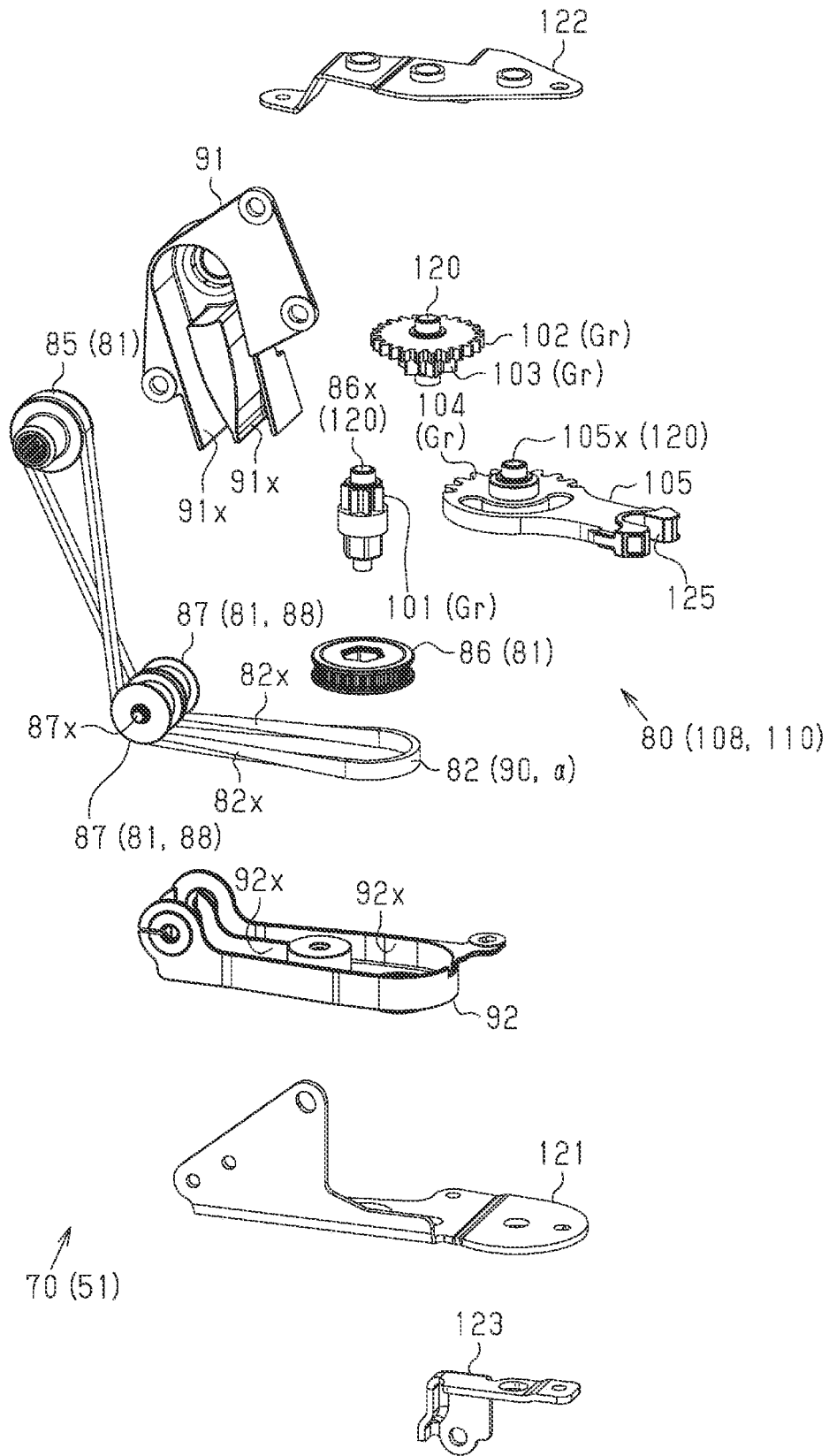
FIG. 12 is an exploded perspective view of a transmission mechanism constituting the drive unit.
Figure 13:
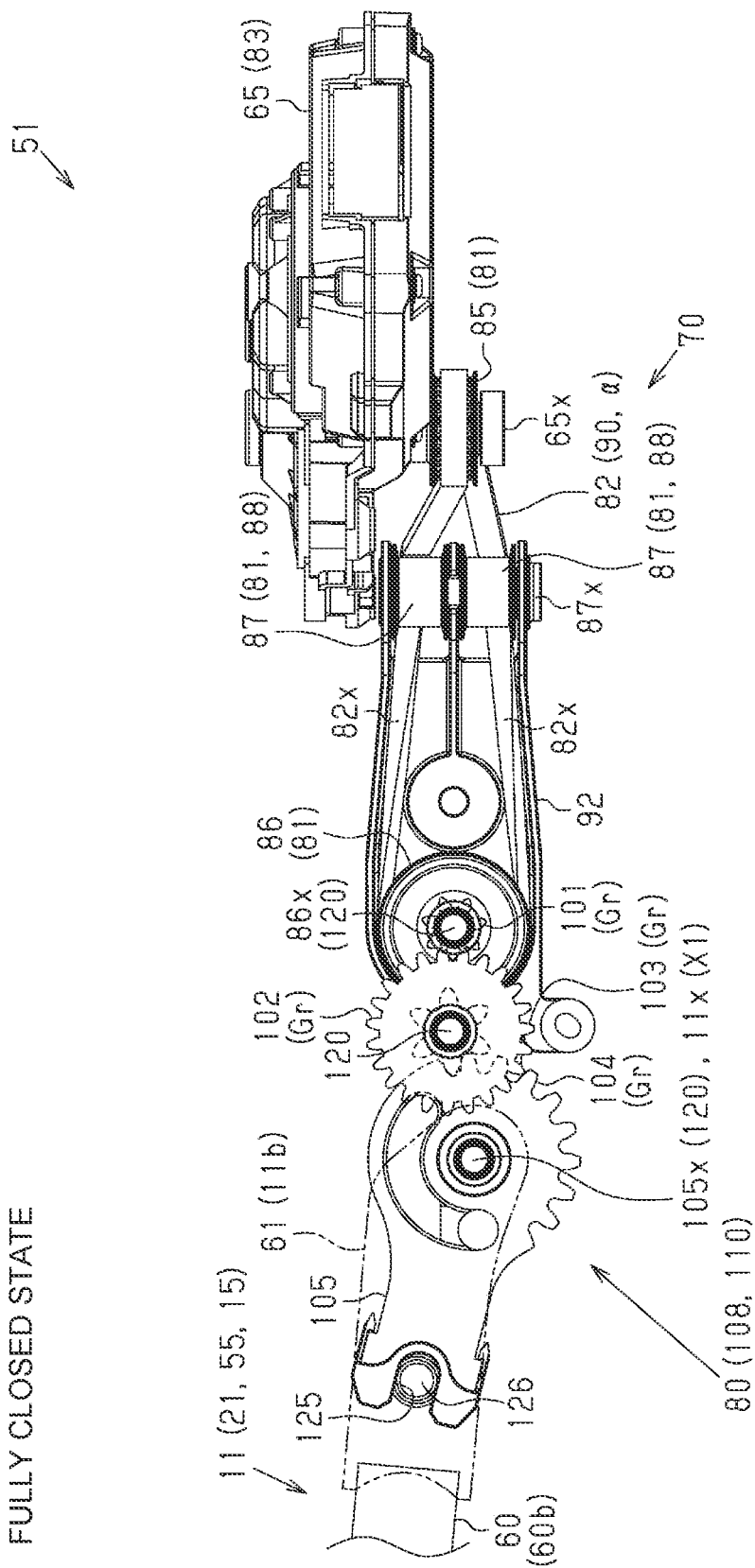
FIG. 13 is a plan view of the drive unit.
Figure 14:
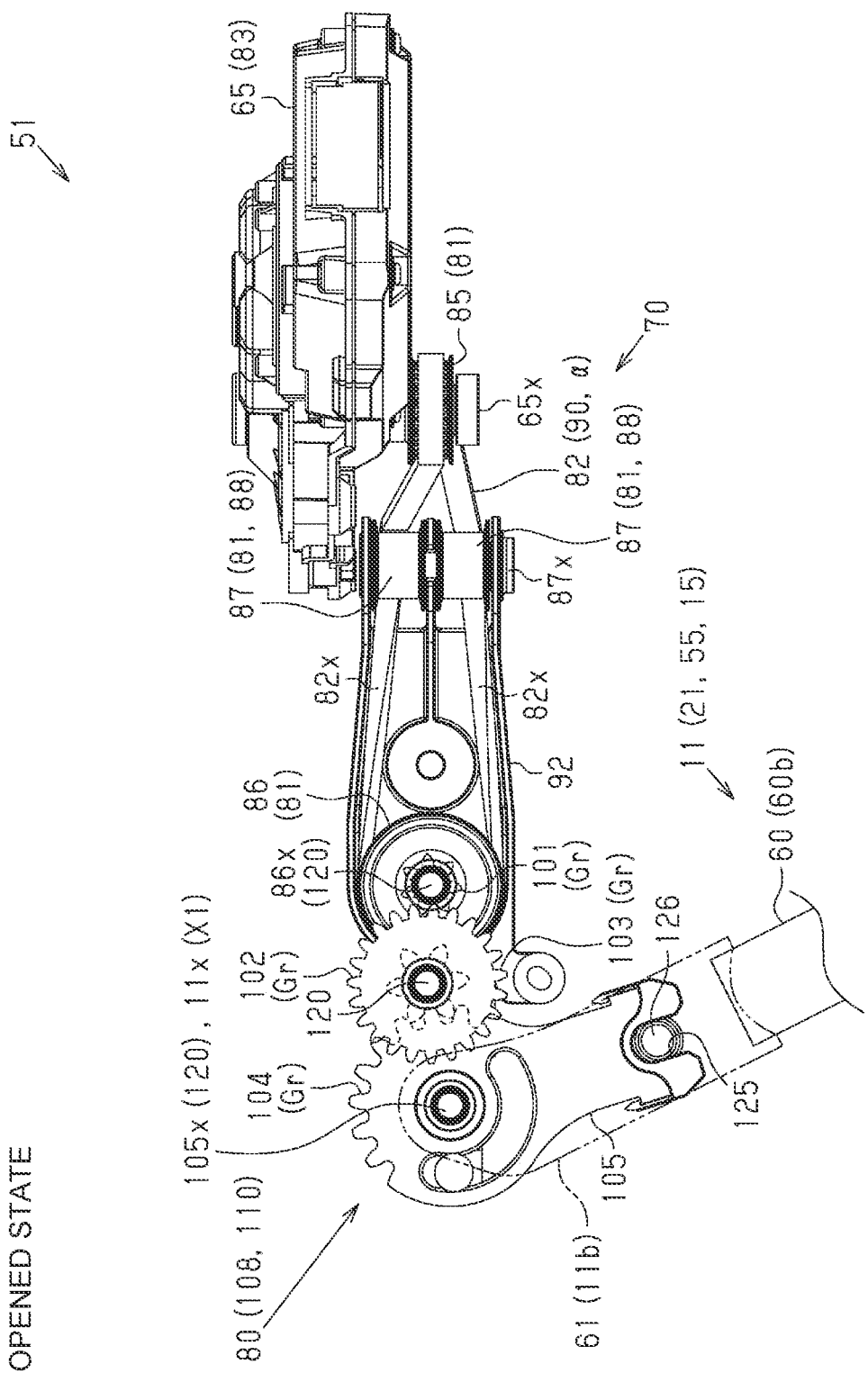
FIG. 14 is a plan view of the drive unit.

As illustrated in FIGS. 12 to 14, the torque input portion 80 of the present embodiment is provided with a first gear 101 that rotates coaxially and integrally with the driven pulley 86 and a second gear 102 that meshes with the first gear 101. In addition, the torque input portion 80 also is provided with a third gear 103 coaxially and integrally rotating with the second gear 102. The torque input portion 80 of the present embodiment is provided with a drive lever 105 that has a sector gear 104 meshing with the third gear 103 and is rotatably and pivotally supported.

That is, the torque input portion 80 of the present embodiment has a configuration as a gear train 108 that transmits the drive torque of the actuator 65 input to the driven pulley 86 via the drive belt 82 by meshing a plurality of gear members Gr. Furthermore, in the torque input portion 80 of the present embodiment, the number of teeth of the second gear 102 is set larger than that of the first gear 101 that rotates integrally with the driven pulley 86 thereof. As a result, in the transmission mechanism 70 of the present embodiment, the torque input portion 80 functions as a speed reducer 110.

Specifically, in the torque input portion 80 of the present embodiment, each of the gear members Gr forming the gear train 108 includes the support shaft 86x of the driven pulley 86 that rotates integrally with the first gear 101, and each includes a support shaft 120 extending in the vertical direction. Specifically, the torque input portion 80 of the present embodiment is provided with a lower holding bracket 121 and an upper holding bracket 122 that interposes each of the gear members Gr in the vertical direction. The torque input portion 80 of the present embodiment is configured to support the support shaft 120 of each of the gear members Gr extending in the vertical direction while being bridged between the lower holding bracket 121 and the upper holding bracket 122.

In the drive unit 51 of the present embodiment, the cover member 92 forming the routing path 92x of the drive belt 82 in the vicinity of the torque input portion 80 is fastened together with the lower holding bracket 121, the upper holding bracket 122, and below the lower holding bracket 121. Furthermore, the drive unit 51 of the present embodiment is provided with a support bracket 123 that supports the lower holding bracket 121 while being fixed to the vehicle body bracket 63. In this state, the torque input portion 80 of the present embodiment is configured to be disposed at a position inside the substantially U-shape formed by the base end bracket 61 provided at the base end portion 11b of the first link arm 11 constituting the drive link 55.

In addition, in the torque input portion 80 of the present embodiment, a support shaft 105x of the drive lever 105 is provided at a position substantially coaxial with the rotation shaft 11x of the first link arm 11. The drive lever 105 of the present embodiment is provided with an engagement recessed portion 125 provided at the end portion opposite to the sector gear 104 constituting the gear train 108 with the support shaft 105x interposed therebetween.

Furthermore, in the door device 20 of the present embodiment, the base end bracket 61 constituting the base end portion 11b of the first link arm 11 is provided with a connecting pin 126 having a shaft shape extending in the vertical direction and fixed to the lower connecting portion 73b. The torque input portion 80 of the present embodiment is configured to input the drive torque of the actuator 65 transmitted via the drive belt 82 to the first link arm 11, in a state where the engagement recessed portion 125 of the drive lever 105 is engaged with the connecting pin 126.

Action

That is, as illustrated in FIGS. 13 and 14, in the torque input portion 80 of the present embodiment, the drive torque of the actuator 65 is input to the driven pulley 86 via the drive belt 82, so that each of the gear members Gr constituting the gear train 108 rotates. Furthermore, based on the drive torque of the actuator 65 transmitted via the gear train 108, the drive lever 105 pivots around the support shaft 105x provided at a position substantially coaxial with the rotation shaft 11x of the first link arm 11 with respect to the vehicle body 2. Based on the driving force input via the connecting pin 126 with which the engagement recessed portion 125 of the drive lever 105 engages, the first link arm 11 as the drive link 55 pivots around the rotation shaft 11x with respect to the vehicle body 2, that is, the first pivotal connection point X1.

Effect

Next, the effects of the present embodiment will be described.

(1) By pivoting the first link arm 11 positioned on the drive link 55, the door device 20 is provided with the drive unit 51 that opens and closes the door 5 of the vehicle 1 based on the operation of the link mechanism 15 formed by the first link arm 11. The drive unit 51 is provided with the actuator 65 that outputs drive torque, and the transmission mechanism 70 that transmits the drive torque to a position separated from the actuator 65. Furthermore, the transmission mechanism 70 is provided with the torque input portion 80 that inputs the drive torque to the first link arm 11 thereof. The transmission mechanism 70 is provided with the power transmission member 90 forming a transmission path a for the drive torque in a state of extending between the actuator 65 and the torque input portion 80, and has the flexibility to enable transmission of the drive torque in a bent state.

According to the above configuration, it is possible to freely set a drive torque transmission path a formed between the actuator 65 and the torque input portion 80, based on the characteristics of the power transmission member 90 that can transmit the drive torque in a bent state. As a result, it is possible to ensure a high degree of freedom in the disposition of the actuator 65.

That is, for example, since the actuator 65 is disposed at a position separated from the rotation shaft 11x of the first link arm 11 that supports the door 5 of the vehicle 1, the actuator 65 is unlikely to be an obstacle to an occupant using the door opening portion 3 provided with the door 5. According to the above configuration, the actuator 65 can be easily disposed at an optimum position that does not interfere with getting on and off of the occupant.

In addition, for example, in a case where the door 5 is in the fully closed state, the actuator 65 can be disposed at an optimum position where the amount of protrusion into the vehicle interior is small. As a result, it is possible to improve the comfort of the occupant getting on in the vicinity of the door 5 provided with the door device 20. The actuator 65 can be easily disposed at an optimum position where the operating sound of the actuator 65 is difficult for the occupant in the vehicle to hear.

(2) The transmission mechanism 70 is provided with, as the power transmission member 90, the drive belt 82 that is wound around the plurality of pulleys 81 and rotationally driven. That is, the drive belt 82 transmits the drive torque in a bent state using the wound pulley 81 as the abutment member 88. Furthermore, the drive belt 82 can be rotationally driven while maintaining the annular shape even in a twisted state. That is, even in a case where a rotary shaft of each of the pulleys 81 around which the drive belts 82 are wound is in a "twisted positional relationship", the twist of the drive belts 82 can absorb such a "twisted positional relationship". As a result, it is possible to freely set the drive torque transmission path a formed by the drive belt 82 extending between the actuator 65 and the torque input portion 80. As a result, it is possible to ensure a high degree of freedom in the disposition of the actuator 65 with a simple configuration while ensuring high reliability.

(3) The torque input portion 80 is supported by the vehicle body 2 while being held by the vehicle body bracket 63 forming the first pivotal connection point X1 with respect to the vehicle body 2. In addition, the actuator 65 is held by the holding bracket 67 provided independently of the vehicle body bracket 63. As a result, the actuator 65 is supported by the vehicle body 2 with the output shaft 65x of the drive torque disposed at a position separated from the torque input portion 80 thereof.

According to the above configuration, the actuator 65 can be stably supported at a position separated from the rotation shaft 11x of the first link arm 11 with respect to the vehicle body 2. As a result, the actuator 65 can be easily disposed at an optimum position that does not interfere with getting on and off of the occupant through the door opening portion 3 provided with the door device 20.

Second Embodiment

A second embodiment embodying a vehicle door device will be described below with reference to the drawings. For the convenience of description, the same reference numerals are given to the same configurations as in the first embodiment, and the description thereof will be omitted.

As illustrated in FIGS. 17 to 20, a door device 220 of the present embodiment differs from the first embodiment in the configuration of a drive unit 251. Specifically, the holding structure of the actuator 65 and the configuration of the transmission mechanism 70 for transmitting the drive torque of the actuator 65 are different.

In addition, also in the door device 220 of the present embodiment, the configuration of the torque input portion 80 constituting the drive unit 251 together with the transmission mechanism 70 is substantially the same as that of the first embodiment. Therefore, for convenience of description, only the driven pulley 86, which is the input end of the drive torque, and a drive lever 205, which is the output end, of each of the constituent elements of the torque input portion 80 are denoted by reference numerals in each drawing. A distal end portion of the drive lever 205 of the present embodiment is directly connected to the base end bracket 61 constituting the base end portion 11b of the first link arm 11. In addition, for each of the individual gear members Gr constituting the gear train 108 and the speed reducer 110, and each of the brackets that supports these members, the descriptions of the reference numerals will be omitted.

Resin Frame

Figure 17:
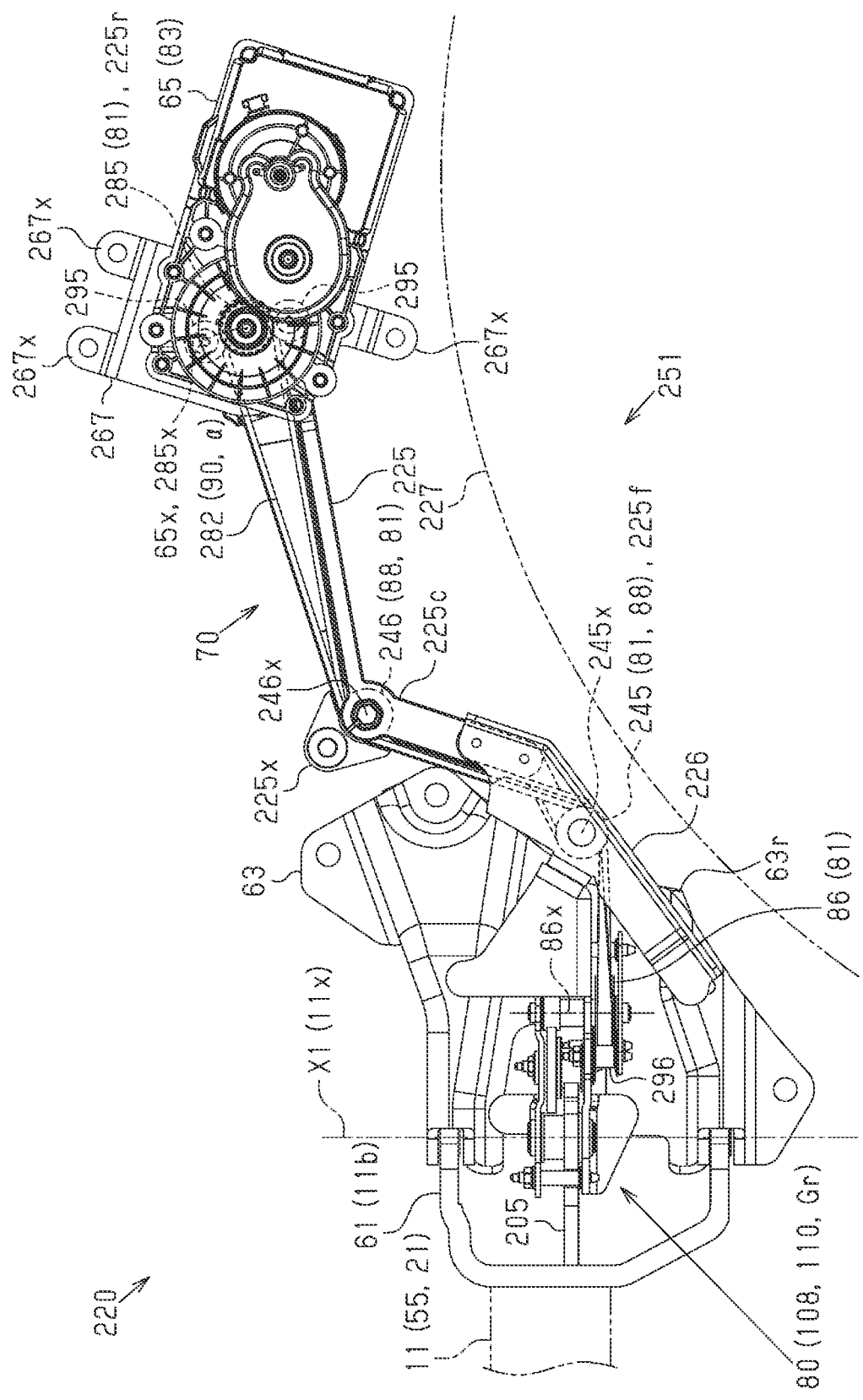
FIG. 17 is a front view of a drive unit according to a second embodiment.
Figure 18:
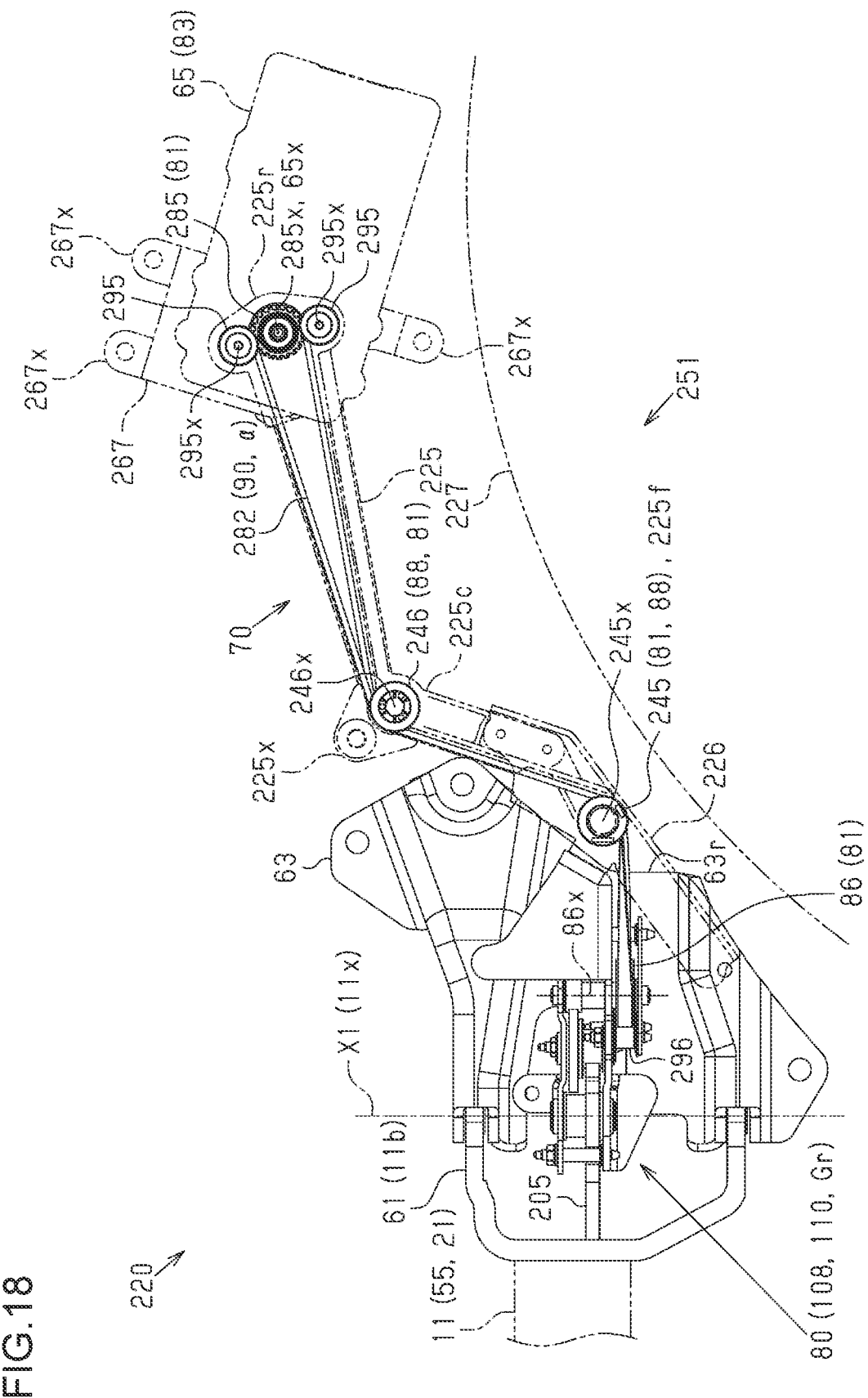
FIG. 18 is an explanatory diagram of a transmission mechanism according to the second embodiment.

The door device 220 of the present embodiment is provided with a frame member 225 extending in the vehicle front-rear direction behind the vehicle body bracket 63 (on the right side in FIGS. 17 and 18). In the door device 220 of the present embodiment, the frame member 225 has a configuration as a so-called resin frame using resin as a material. Furthermore, a holding bracket 267 holding the actuator 65 is connected to a rear end portion 225r of the frame member 225. As a result, the drive unit 251 of the present embodiment is configured such that the actuator 65 is disposed at a position separated from the rotation shaft 11x of the first link arm 11 positioned as the drive link 55 than in the first embodiment.

Specifically, in the door device 220 of the present embodiment, each of the frame member 225 and the holding bracket 267 has fixing portions 225x and 267x to the vehicle body 2. Furthermore, the door device 220 of the present embodiment is provided with a connecting member 226 that connects the frame member 225 to a rear end portion 63r of the vehicle body bracket 63. As a result, the drive unit 251 of the present embodiment is configured such that a front end portion 225f of the frame member 225 is disposed in the vicinity of the rear end portion 63r of the vehicle body bracket 63.

In addition, the frame member 225 of the present embodiment has a substantially chevron-shaped bent shape in which the intermediate portion in the extending direction thereof protrudes upward in state where the frame member 225 is fixed to the vehicle body 2. Furthermore, the frame member 225 extends in the vehicle front-rear direction in an aspect that detours above a wheel house 227 located behind the vehicle body bracket 63 based on the bent shape. As a result, the drive unit 251 of the present embodiment is configured such that the actuator 65 supported by the rear end portion 225r of the frame member 225 is disposed on the upper rear side of the wheel house 227.

First and Second Intermediate Pulleys

In addition, the drive unit 251 of the present embodiment is provided with first intermediate pulleys 245 and 245 provided at the front end portion 225f of the frame member 225. In addition, the drive unit 251 is provided with second intermediate pulleys 246 and 246 provided at an intermediate portion 225c of the frame member 225, which is the vertex of the substantially chevron-shaped bent shape. Also in the drive unit 251 of the present embodiment, the first intermediate pulleys 245 and 245 and the second intermediate pulleys 246 and 246 each include common support shafts 245x and 246x extending in the vehicle width direction (in FIGS. 17 to 19, the direction perpendicular to the paper surface). In the drive unit 251 of the present embodiment, the drive belt 282 is wound around the first intermediate pulleys 245 and 245 and the second intermediate pulleys 246 and 246 from different directions.

That is, also in the drive unit 251 of the present embodiment, the transmission mechanism 70 is formed using the drive belt 282 wound around a drive pulley 285 and the driven pulley 86 as the power transmission member 90. Furthermore, each of the first and second intermediate pulleys 245 and 246 are used as the abutment members 88, and the drive belt 282 is wound around each of the first and second intermediate pulleys 245 and 246 in a bent state. As a result, in the transmission mechanism 70 of the present embodiment, the drive belt 82 serving as the power transmission member 90 interposed between the actuator 65 and the torque input portion 80 is configured to form a drive torque transmission path a that is vertically bent at two locations in the extending direction.

Specifically, in the drive unit 251 of the present embodiment, the annular shape of the drive belt 282 wound around the drive pulley 285 and the driven pulley 86 forms two long side portions 282x and 282x extending in the direction where the drive pulley 285 and the driven pulley 86 are separated from each other. In addition, in the drive unit 251 of the present embodiment, each of these long side portions 282x and 282x of the drive belt 282 is wound around the first intermediate pulleys 245 and 245 from below (lower side in FIGS. 17 to 19). Furthermore, each of these long side portions 282x and 282x is wound around the second intermediate pulleys 246 and 246 from above (upper side in FIGS. 17 to 19). As a result, in the door device 220 of the present embodiment, the drive belt 82 extending between the actuator 65 and the torque input portion 80 is configured to be routed along the bent shape of the substantially chevron-shaped frame member 225.

Furthermore, also in the drive unit 251 of the present embodiment, the driven pulley 86 constituting the torque input portion 80 includes the support shaft 86x extending in the vertical direction of the vehicle 1 similar to the rotation shaft 11x of the first link arm 11 constituting the drive link 55. On the other hand, the drive pulley 285 rotationally driven by the actuator 65 is provided in a state where a support shaft 285x serving as an output shaft 65x of the actuator 65 extends in the vehicle width direction. The transmission mechanism 70 of the present embodiment is also configured to absorb the "twisted positional relationship" set between the support shaft 86x of the driven pulley 86 and the support shaft 285x of the drive pulley 285 based on a twist γ set in the drive belt 282.

Figure 21:
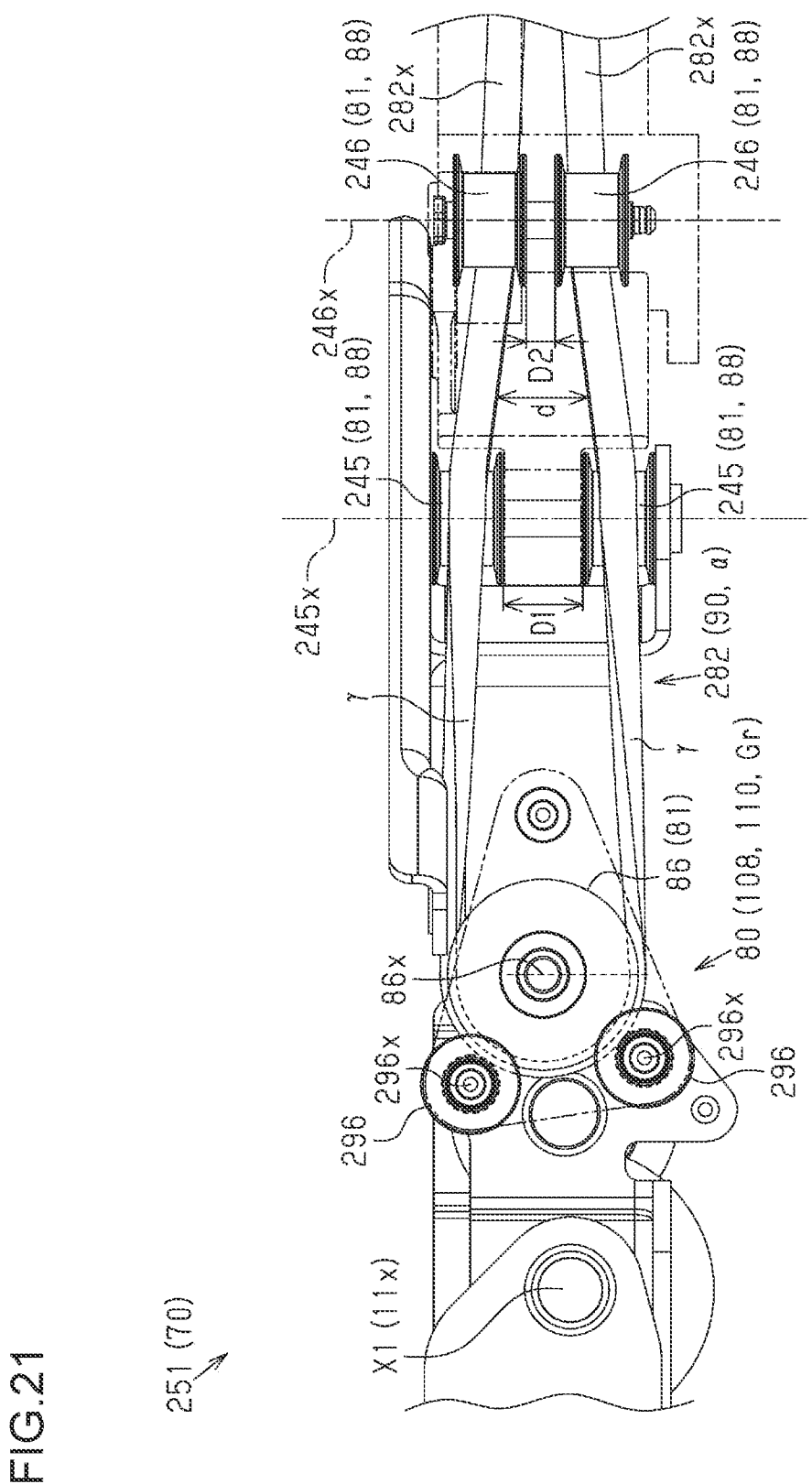
FIG. 21 is a bottom view of the drive unit according to the second embodiment.
Figure 22:
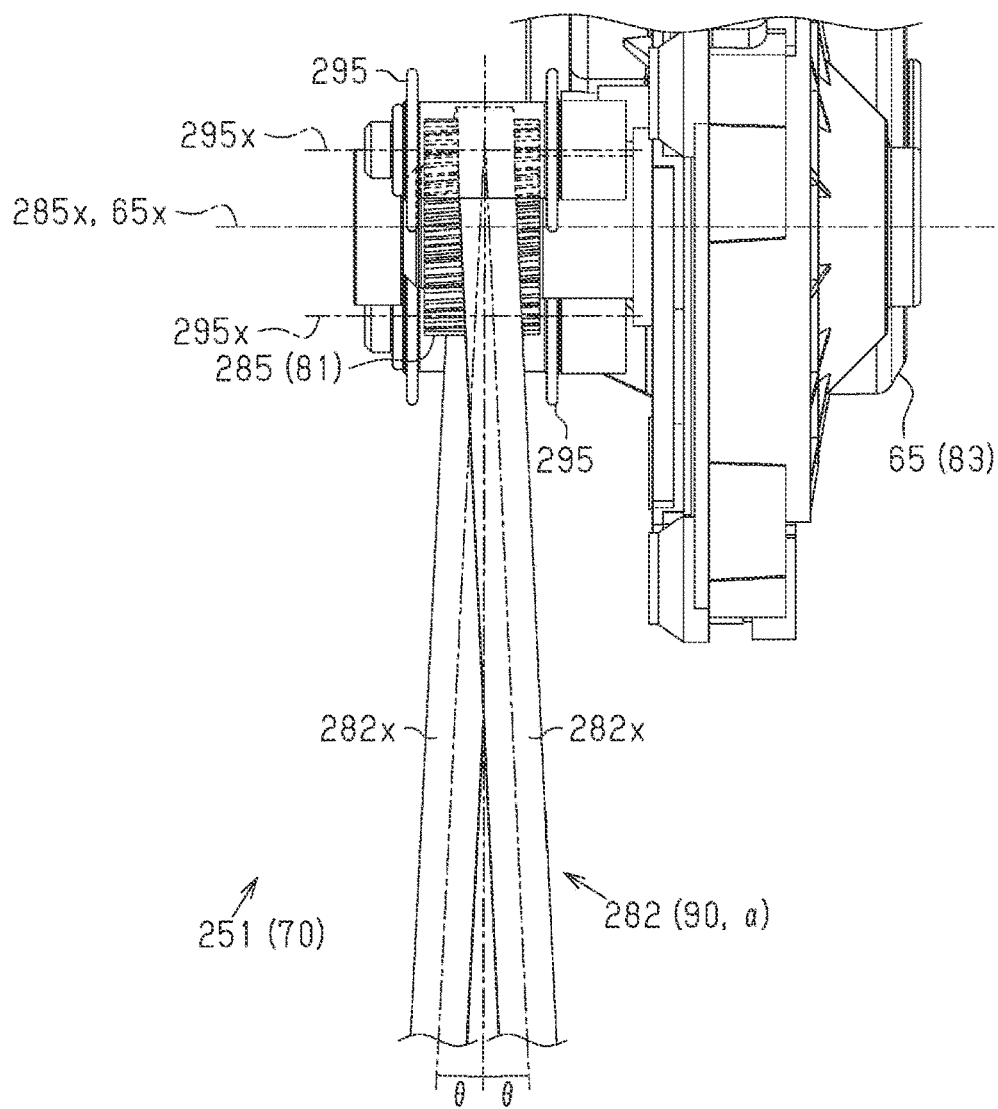
FIG. 22 is an enlarged view of the vicinity of a drive pulley according to the second embodiment.

Specifically, as illustrated in FIGS. 21 and 22, in the drive unit 251 of the present embodiment, the twist γ of the drive belt 282 is set between the driven pulley 86 and the first intermediate pulleys 245 and 245. In addition, in the drive unit 251 of the present embodiment, the separation distance D2 between the second intermediate pulleys 246 and 246 sharing the support shaft 246x is similarly set narrower than the separation distance D1 between the first intermediate pulleys 245 and 245 sharing the support shaft 245x (D1>D2). Furthermore, in the drive belt 282 of the present embodiment, the interval d between the long side portions 282x and 282x is narrowed between the first intermediate pulleys 245 and 245 and the second intermediate pulleys 246 and 246. As a result, the drive unit 251 of the present embodiment is configured to keep the approach angle θ of each of the long side portions 282x and 282x with respect to the drive pulley 285 caused by the twist γ imparted to the drive belt 282 small.

Toothed Pulley with Helical Teeth

In addition, as illustrated in FIG. 22, in the drive unit 251 of the present embodiment, the drive pulley 285 rotationally driven by the actuator 65 has a configuration as a "toothed pulley with helical teeth". That is, the drive belt 282 of the present embodiment has a configuration as a so-called "toothed belt" having gear teeth on the inner peripheral side of the annular shape. Furthermore, in the drive unit 251 of the present embodiment, when the drive belt 282 is wound around the drive pulley 285, an approach angle θ caused by the twist γ of the drive belt 282 is generated. The drive unit 251 of the present embodiment is configured to absorb the approach angle θ of the drive belt 282 wound around the drive pulley 285 by the twist angle of the "helical teeth" set on the drive pulley 285.

Guide Roller

In addition, as illustrated in FIG. 21, in the drive unit 251 of the present embodiment, a plurality of guide rollers 296 having a configuration as a rotation member are provided at positions where the drive belt 282 is interposed with the driven pulley 86.

Specifically, the drive unit 251 of the present embodiment is provided with two guide rollers 296 and 296 provided radially outside the driven pulley 86 in the circumferential section in which the drive belt 282 is wound around the driven pulley 86. Each of these guide rollers 296 and 296 is rotatably and pivotally supported around support shafts 296x and 296x provided substantially parallel to the support shaft 86x of the driven pulley 86. Furthermore, in the drive unit 251 of the present embodiment, each of these guide rollers 296 and 296 includes the support shafts 296x and 296x at a position separated from the drive pulley 285 (left side in FIG. 21) than the support shaft 86x of the driven pulley 86. As a result, in the vicinity of the driven pulley 86, the drive unit 251 of the present embodiment is configured to suppress the influence of the twist γ imparted to the drive belt 282, that is, a so-called "fluttering" around the driven pulley 86 that occurs when the drive belt 282 is rotationally driven.

Figure 19:
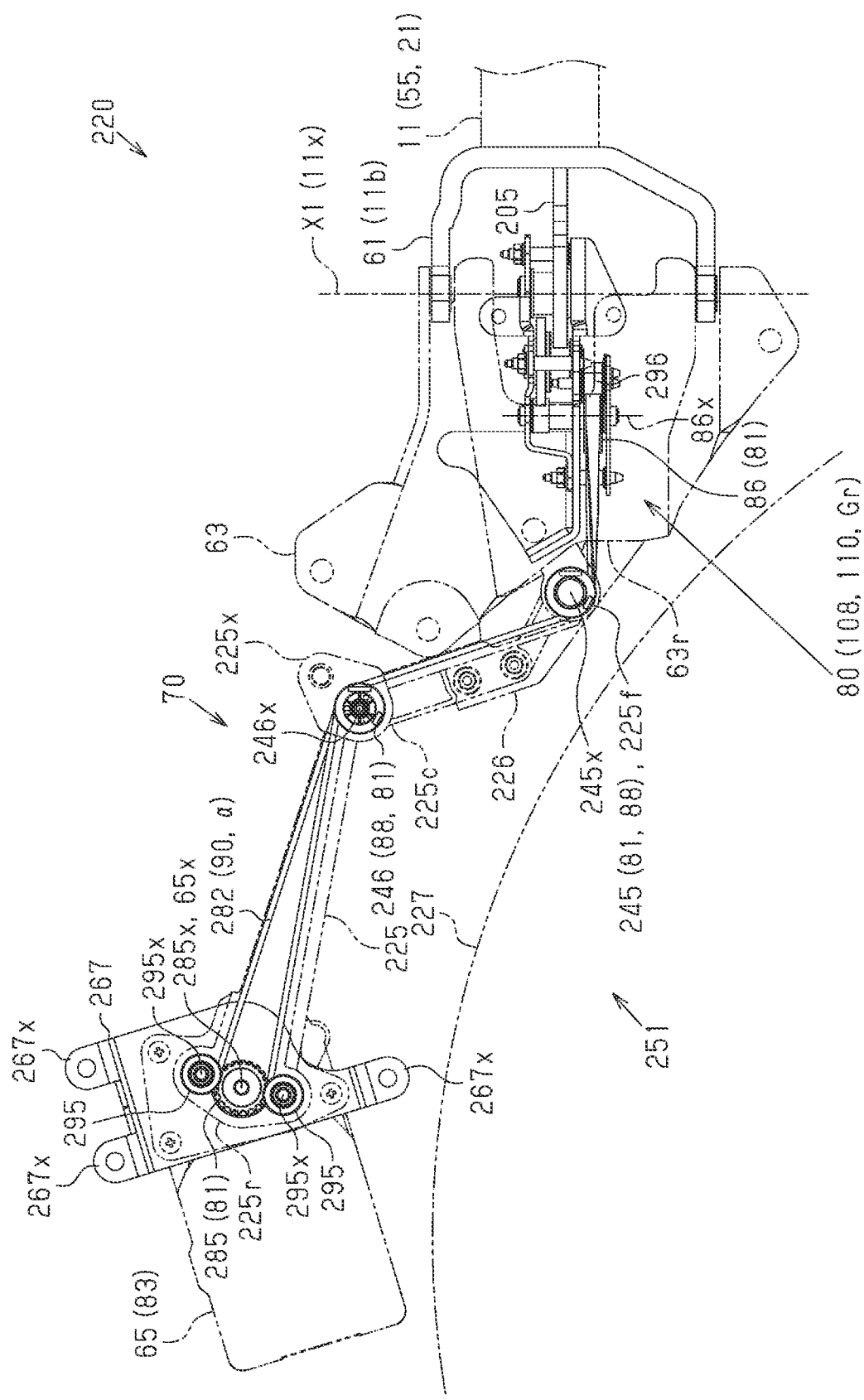
FIG. 19 is a rear view of the drive unit according to the second embodiment.

As illustrated in FIGS. 19 and 22, in the drive unit 251 of the present embodiment, a plurality of guide rollers 296 are also provided at positions where the drive belt 282 is interposed with the drive pulley 285. Specifically, the drive unit 251 of the present embodiment is provided with two guide rollers 295 and 295 provided radially outside the drive pulley 285 at positions substantially at both ends of the circumferential section where the drive belt 282 is wound around the drive pulley 285. Furthermore, each of these guide rollers 295 and 295 are rotatably and pivotally supported around the support shafts 295x and 295x provided substantially parallel to the support shaft 86x of the driven pulley 86. As a result, the drive unit 251 of the present embodiment can efficiently rotationally drive the drive belt 282 based on the driving force of the actuator 65 transmitted through the drive pulley 285.

As described above, according to the configuration of the present embodiment, it is possible to ensure a high degree of freedom in the disposition of the actuator 65, similar to the first embodiment. The actuator 65 can be disposed at a position separated from the rotation shaft 11x of the first link arm 11 with respect to the vehicle body 2 as compared with the first embodiment.

Figure 20:
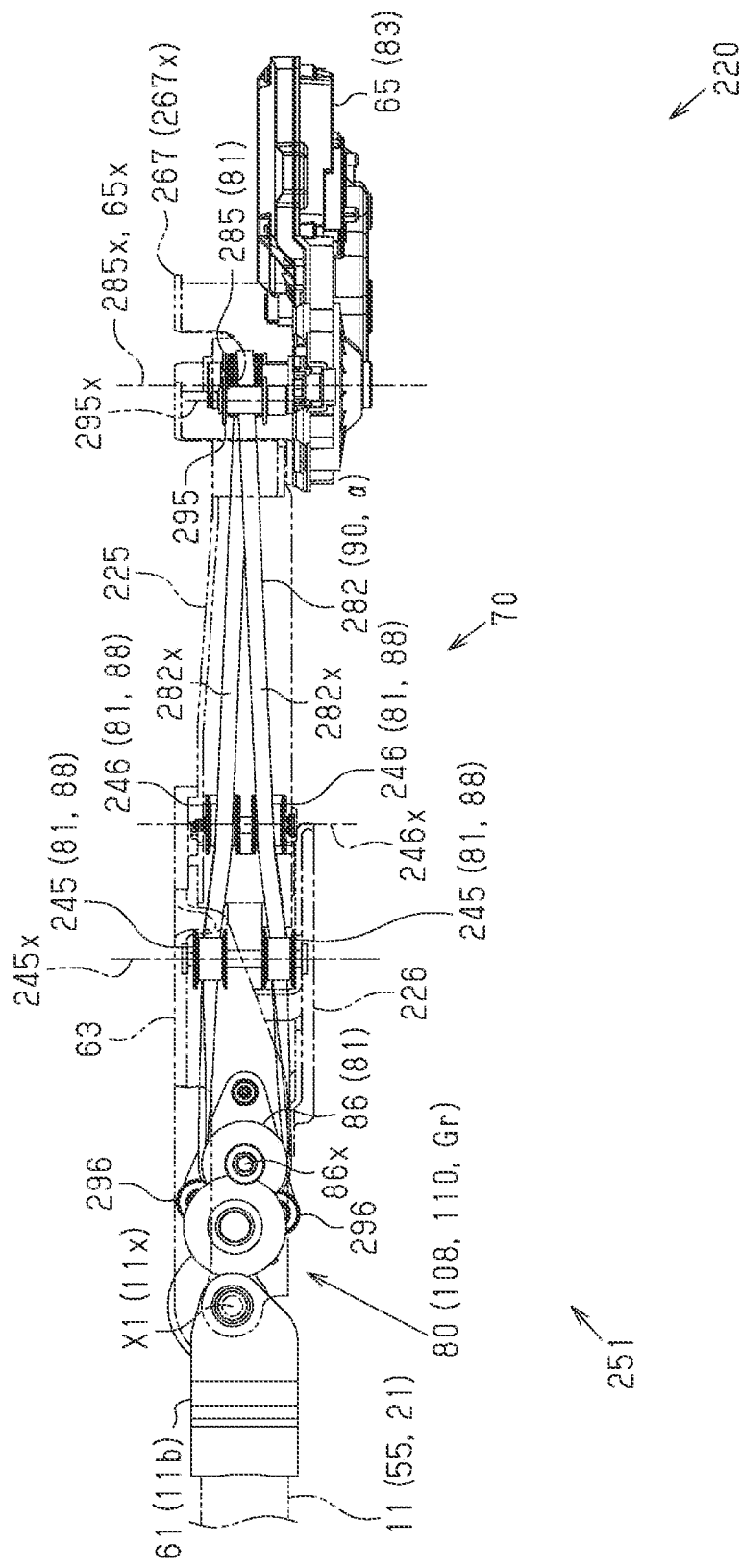
FIG. 20 is a top view of the drive unit according to the second embodiment.

Specifically, when the drive units 51 and 251 are mounted on the vehicle 1, that is, when viewed from above in the vehicle-mounted state, the actuator 65 and the torque input portion 80 are disposed at positions that do not overlap with each other (refer to FIG. 20). In other words, the actuator 65 and the torque input portion 80 are disposed such that the position of the actuator 65 in the vehicle front-rear direction and the position of the torque input portion 80 in the vehicle front-rear direction do not overlap with each other when viewed in the vehicle width direction. This also applies to the first embodiment. Furthermore, in the second embodiment, the actuator 65 and the torque input portion 80 can be disposed at the positions further separated from each other in the vehicle front-rear direction. The actuator 65 and the torque input portion 80 can be disposed at the positions further separated in the vehicle width direction. Also in the vertical direction of the vehicle 1, the actuator 65 and the torque input portion 80 can be disposed at the positions further separated from each other.

In addition, according to the configuration of the present embodiment, the following characteristic effects can be obtained.

(1) The door device 220 is provided with the frame member 225 interposed between the holding bracket 267 holding the actuator 65 and the vehicle body bracket 63 holding the torque input portion 80.

According to the above configuration, the actuator 65 and the torque input portion 80 can be more stably supported in a state where the actuator 65 and the torque input portion 80 are disposed at the positions separated from each other.

(2) The drive unit 251 absorbs the "twisted positional relationship" set between the support shaft 86x of the driven pulley 86 and the support shaft 285x of the drive pulley 285 based on the twist γ of the drive belt 282 constituting the transmission mechanism 70. The drive unit 251 is provided with the guide roller 296 provided at a position that interposes the drive belt 282 with the driven pulley 86 on the radially outside the driven pulley 86.

That is, by setting the twist γ in the drive belt 282, a so-called "fluttering" occurs around the driven pulley 86 when the drive belt 282 is rotationally driven. That is, in the vicinity of the driven pulley 86, the long side portions 282x and 282x of the drive belt 282 extending from the driven pulley 86 toward the drive pulley 285 are likely to swing. In a case where such "fluttering" is suppressed by a guide member having a sliding contact surface with respect to the drive belt 282, there is a problem that the guide member and the drive belt 282 are likely to be worn.

In this regard, by using the guide roller 296 configured as a rotation member as described above, it is possible to more effectively suppress the "fluttering" of the drive pulley 285 around the driven pulley 86. At the same time, there is an advantage that the drive belt 282 is unlikely to be worn.

(3) The drive belt 282 has a configuration as a "toothed belt" having gear teeth on the inner peripheral side of the annular shape. Furthermore, the drive belt 282 has an approach angle θ with respect to the drive pulley 285 based on the twist γ imparted to the drive belt 282. The drive pulley 285 has "helical teeth" corresponding to the approach angle θ of the drive pulley 285.

According to the above configuration, the approach angle θ of the drive belt 282 wound around the drive pulley 285 can be absorbed by the twist angle of the "helical teeth" set on the drive pulley 285. As a result, the drive belt 282 can be rotationally driven more stably.

That is, in a case where the drive belt 282 wound around the drive pulley 285 has an approach angle θ when the actuator 65 starts to drive, the drive belt 282 wound around the drive pulley 285 is likely to be displaced in the axial direction based on the drive torque. As a result, for example, the drive belt 282 slidingly contacts with the axial end portion of the drive pulley 285 having a flange shape to generate sliding resistance. As a result, there is a possibility that the drive torque transmission efficiency is reduced and the drive belt 282 may be worn. Furthermore, in a case where the drive pulley 285 is a "spur toothed pulley", so-called "tooth skipping" is likely to occur when the actuator 65 starts to drive. There is a problem that uneven wear occurs in the gear teeth of the drive belt 282 having the configuration of the "toothed belt".

However, according to the above configuration, the "helical teeth" of the drive pulley 285 suppress the influence of the approach angle θ of the drive belt 282. As a result, high reliability can be ensured.

Each of the above-described embodiments can be modified and implemented as follows. Each of the above-described embodiments and the following modification examples can be implemented in combination with each other within a technically consistent range.

In each of the above-described embodiments, by imparting the twist to the drive belt 82 constituting the power transmission member 90, the "twisted positional relationship" between the output shaft 65x of the actuator 65 provided with the drive pulley 85 and the support shaft 86x of the driven pulley 86 is absorbed. As a result, the "twisted positional relationship" set between the output shaft 65x of the actuator 65 and the rotation shaft 11x of the first link arm 11 pivoted by the input of the drive torque thereof can be allowed.

Figure 15:
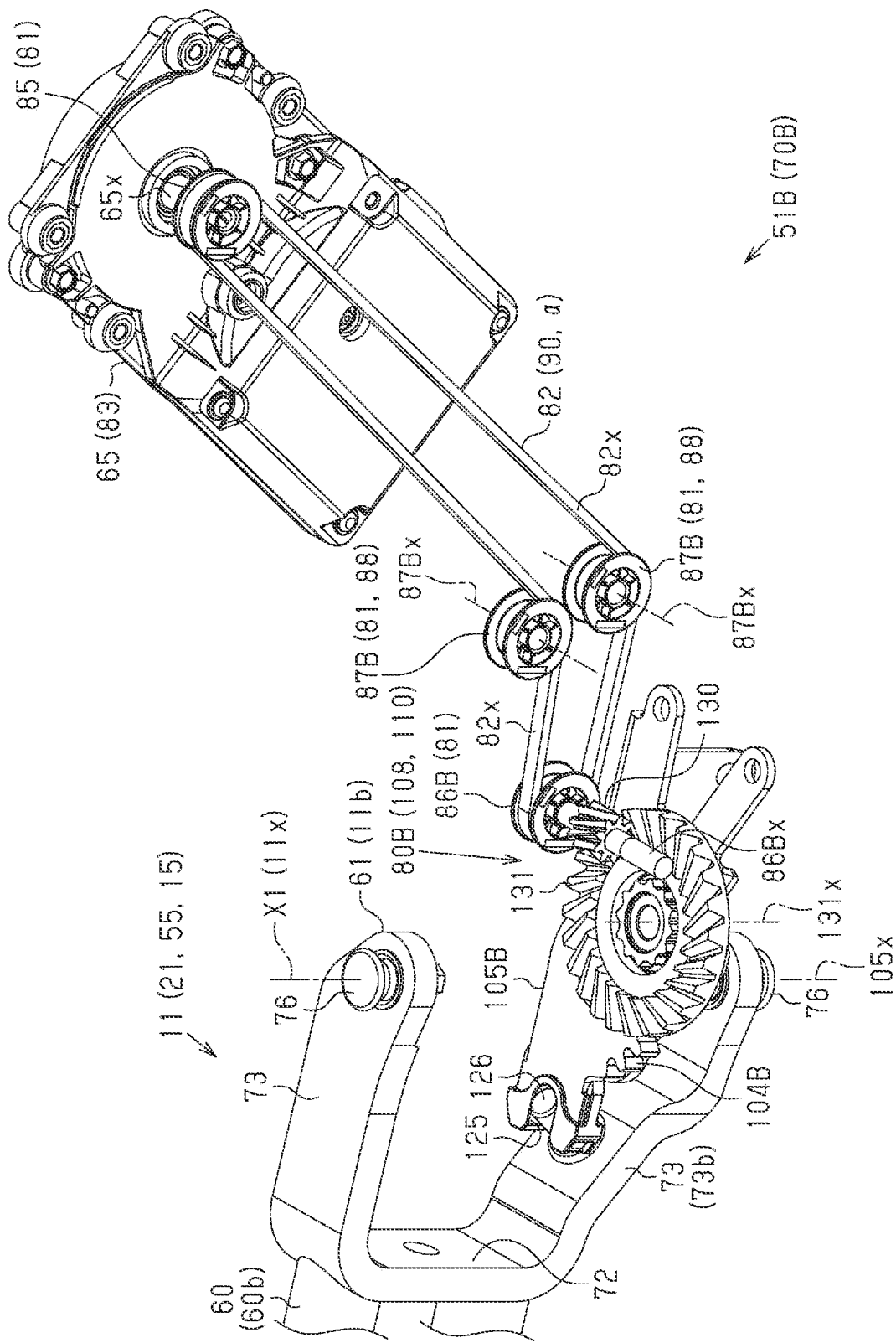
FIG. 15 is a perspective view of a drive unit of another example.
Figure 16:
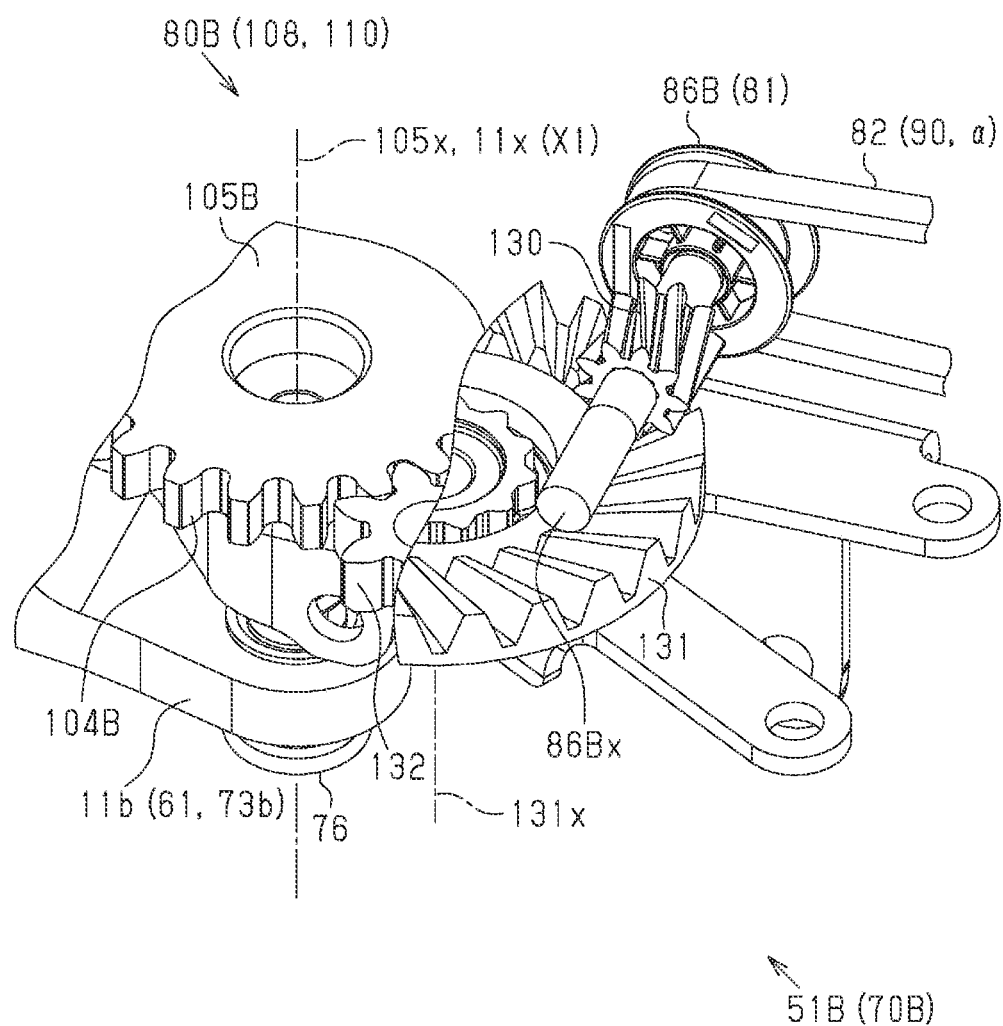
FIG. 16 is an enlarged view of a torque input portion of another example.

However, the configuration is not limited thereto, for example, like a drive unit 51B of another example shown in FIGS. 15 and 16, a torque input portion 80B may be configured to absorb such a "twisted positional relationship" between the output shaft 65x of the actuator 65 and the rotation shaft of the drive link 55.

Specifically, in the drive unit 51B of the other example, the torque input portion 80B is provided with a support shaft 86Bx of a driven pulley 86B disposed in parallel with the output shaft 65x of the actuator 65 and a support shaft 87Bx of each of intermediate pulleys 87B. In addition, the torque input portion 80B is provided with a pinion gear 130 that rotates integrally with the driven pulley 86B, and a crown gear 131 having a support shaft 131x disposed parallel to the rotation shaft 11x of the first link arm 11 and meshing with the pinion gear 130. Furthermore, this torque input portion 80B is provided with a second pinion gear 132 that rotates integrally with the crown gear 131 thereof. The second pinion gear 132 of the torque input portion 80B meshes with a sector gear 104B of a drive lever 105B.

That is, in the torque input portion 80B of the other example, the meshing between the pinion gear 130 and the crown gear 131 whose rotation shafts are orthogonal to each other absorbs the "twisted positional relationship" with the rotation shaft of the drive link 55. As a result, the drive unit 51B of the other example is also configured so that the first link arm 11 pivots around the rotation shaft 11x, based on the pivot of the drive lever 105B having the support shaft 105x disposed coaxially with the rotation shaft 11x of the first link arm 11.

Even when such a configuration is employed, it is possible to ensure a high degree of freedom in the disposition of the actuator 65, similar to the above embodiment. In the transmission mechanism 70B, by absorbing the "twisted positional relationship" set between the output shaft 65x of the actuator 65 and the support shaft of the drive link 55, the drive link can be pivoted efficiently based on the driving force of the actuator 65.

In addition, for example, a power transmission member 90 other than the drive belt 82, such as a flexible cable or a flexible shaft, may be used as long as the member has the flexibility that enables transmission of drive torque in a bent state. The configuration of the abutment member 88 that abuts on the power transmission member 90 to bend the power transmission member 90 may also be randomly changed. For example, a configuration in which a wall portion having a curved abutment surface is used as the abutment member 88 may be employed.

In each of the above-described embodiments, the drive unit 51 uses the first link arm 11 positioned on the main link 21 as the drive link 55, and applies the driving force of the actuator 65 to the first link arm 11. However, the configuration is not limited thereto, and a configuration in which the second link arm 12 positioned on the sub-link 22 is used as the drive link 55 and the driving force of the actuator 65 is applied to the second link arm 12 may be applied. A configuration in which both first and second link arms 11 and 12 are used as drive links 55, and the driving force of the actuator 65 is applied to each of the first and second link arms 11 and 12 may be applied.

In each of the above-described embodiments, the torque input portion 80 inputs the drive torque of the actuator 65 to the base end portion 11b of the first link arm 11 forming the first pivotal connection point X1 with respect to the vehicle body 2. However, the configuration is not limited thereto, and a configuration in which the torque input portion 80 inputs the drive torque of the actuator 65 to a distal end portion 11a of the first link arm 11 forming the second pivotal connection point X2 with respect to the door 5 may be applied.

That is, the disposition of the torque input portion 80 may be randomly changed. In addition, the disposition of the actuator 65 may not necessarily be provided on the vehicle body 2. A configuration including the actuator 65 provided on the door 5 may be employed. The support structure of the actuator 65 may also be randomly changed.

In each of the above-described embodiments, although a configuration in which the door 5 of the vehicle 1 is opened toward the rear side of the vehicle is applied, a configuration in which the door 5 is opened toward the front side of the vehicle may be applied.

In the second embodiment described above, the two guide rollers 296 and 296 configured as the rotation members are provided at radially outer positions where the drive belt 282 is interposed with the driven pulley 86. Each of these guide rollers 296 and 296 has the support shafts 296x and 296x at positions separated from the drive pulley 285 than the support shaft 86x of the driven pulley 86. However, the configuration is not limited thereto, and the number and disposition of the guide rollers 296 disposed radially outside the driven pulley 86 may be randomly changed.

Figure 23:
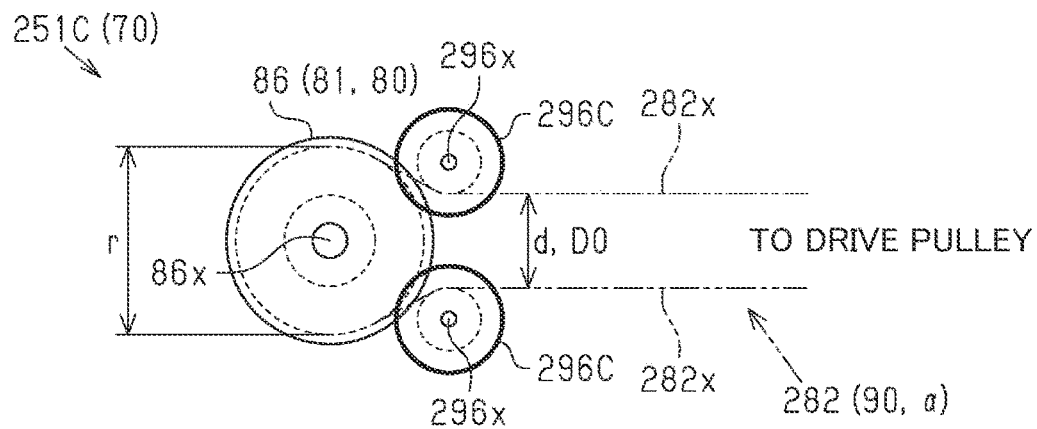
FIG. 23 is a bottom view of a drive unit of another example.

For example, as illustrated in FIG. 23, a configuration in which the guide roller 296 is disposed may be employed at a position where the interval d between both long side portions 282x and 282x of the drive belt 282 wound around the driven pulley 86 is narrower than the diameter r of the driven pulley 86.

That is, a drive unit 251C of the other example includes a pair of guide rollers 296C and 296C provided at a position closer to the drive pulley 285 than the support shaft 86x of the driven pulley 86 (on the right side in FIG. 23). Furthermore, in the drive unit 251C of the other example, the separation distance D0 between the two guide rollers 296C and 296C in a direction perpendicular to the direction where both long side portions 282x and 282x of the drive belt 282 extend is narrower than the diameter r of the driven pulley 86 (D0<r). As a result, the drive unit 251C of the other example is configured such that the interval d between both long side portions 282x and 282x of the drive belt 282 wound around the driven pulley 86 is narrower than the diameter r of the driven pulley 86.

Also in the drive unit 251C of the other example, the direction where both long side portions 282x and 282x of the drive belt 282 wound around the driven pulley 86 extend (left-right direction in FIG. 23) is the vehicle front-rear direction, and the direction orthogonal thereto (vertical direction in the drawing) is the vehicle width direction. In addition, the diameter r of the driven pulley 86 is the diameter of the main body portion around which the drive belt 282 is wound. The separation distance D0 between both two guide rollers 296C and 296C is also the separation distance between the main body portions pressed against both long side portions 282x and 282x of the drive belt 282.

By adopting such a configuration, the separation distance D1 between the first intermediate pulleys 245 and 245 can be set narrower. Furthermore, the separation distance D2 between the second intermediate pulleys 246 and 246 can also be set narrower. As a result, the approach angle of each of the long side portions 282x and 282x with respect to the drive pulley 285 caused by the twist γ imparted to the drive belt 282 can be set smaller. As a result, the drive belt 282 can be rotationally driven more stably. In addition, since the approach angle θ of the drive belt 282 with respect to the drive pulley 285 is reduced, the size of the device can be reduced.

Even in the case of adopting such a configuration, when it is possible to narrow the interval d between both long side portions 282x and 282x of the drive belt 282 wound around the driven pulley 86, the number and disposition of the guide rollers 296C may be randomly changed. Furthermore, the number of guide rollers 296C disposed at a position closer to the drive pulley 285 than the support shaft 86x of the driven pulley 86 may be one, or three or more. For the guide roller 295 disposed radially outside the drive pulley 285, such a configuration that narrows the interval d between both long side portions 282x and 282x of the drive belt 282 may be applied.

The number and disposition of the guide rollers 295 disposed radially outside the drive pulley 285 may also be randomly changed. A configuration without such a guide roller 295 may also be used.

In the above-described second embodiment, the drive pulley 285 is a "toothed pulley with helical teeth". However, the configuration is not limited thereto, for example, when the drive belt 282 is wound around the driven pulley 86, in a case where an approach angle θ caused by the twist γ of the drive belt 282 is generated, the driven pulley 86 may be configured as the "toothed pulley with helical teeth". That is, regardless of the function of the pulley 81, the pulley 81 having the approach angle of the drive belt 282 may be the "toothed pulley with helical teeth".

In the above-described first embodiment, the pair of intermediate pulleys 87 and 87 around which the drive belt 82 is wound is provided at one location between the drive pulley 85 and the driven pulley 86. In the above-described second embodiment, the first intermediate pulleys 245 and 245 and the second intermediate pulleys 246 and 246 around which the drive belt 82 is wound are provided at two locations between the drive pulley 285 and the driven pulley 86. However, the configuration is not limited thereto, and the intermediate pulleys may be disposed at three or more locations. The direction where the drive belt is wound around each of these intermediate pulleys may also be randomly changed.

Next, technical ideas that can be grasped from the above-described embodiment and modification example will be described.

(a) The frame member interposed between the holding bracket and the vehicle body bracket is provided. As a result, the actuator and the torque input portion can be more stably supported in a state where the actuator and the torque input portion are disposed at positions separated from each other.

(b) The twist is set in the drive belt, the drive belt is a toothed belt, and the pulley having an approach angle of the drive belt based on the twist is a toothed pulley with helical teeth. According to the above configuration, the approach angle of the drive belt wound around the pulley can be absorbed by the twist angle of the "helical teeth" set on the pulley. As a result, the drive belt can be rotationally driven more stably.

(c) The twist is set in the drive belt, and the rotation member is provided at a position where the drive belt is interposed with the pulley.

That is, in a case where the twist is set in the drive belt, so-called "fluttering" is likely to occur around the pulley when the drive belt is rotationally driven. However, by using the rotation member as described above, it is possible to effectively suppress the "fluttering" of the drive pulley around the pulley. At the same time, there is an advantage that the drive belt is unlikely to be worn.

(d) The drive belt wound around the pulley forms a pair of long side portions, and the rotation member is provided at a position where the interval between both long side portions is narrower than the diameter of the pulley.

According to the above configuration, the approach angle of each of the long side portions to the pulley formed based on the twist imparted to the drive belt can be set smaller. As a result, the drive belt can be rotationally driven more stably. In addition, by reducing the approach angle, it is possible to reduce the size of the device.

According to Aspect 1 of this disclosure, there is provided a vehicle door device including first and second link arms each including a first pivotal connection point to a vehicle body and a second pivotal connection point to a door of a vehicle, and a drive unit that opens and closes the door based on an operation of a link mechanism formed by the first and second link arms by using at least one of the first and second link arms as a drive link and pivoting the drive link, in which the drive unit includes an actuator that outputs drive torque, and a transmission mechanism that transmits the drive torque to the drive link disposed at a position separated from the actuator, and the transmission mechanism includes a torque input portion that inputs the drive torque to the drive link, and a power transmission member that forms a transmission path for the drive torque in a state of extending between the actuator and the torque input portion and has flexibility to enable transmission of the drive torque in a bent state.

According to the above configuration, it is possible to freely set a drive torque transmission path formed between the actuator and the torque input portion, based on the characteristics of the power transmission member that can transmit the drive torque in a bent state. As a result, it is possible to ensure a high degree of freedom in the disposition of the actuator.

That is, for example, since the actuator is disposed at a position separated from the rotation shaft of the first link arm that supports the door of the vehicle, the actuator is unlikely to be an obstacle to an occupant using the door opening portion provided with the door. According to the above configuration, the actuator can be easily disposed at an optimum position that does not interfere with getting on and off of the occupant.

In addition, for example, in a case where the door is in the fully closed state, the actuator can be disposed at an optimum position where the amount of protrusion into the vehicle interior is small. As a result, it is possible to improve the comfort of the occupant getting on in the vicinity of the door provided with the door device. The actuator can be easily disposed at an optimum position where the operating sound of the actuator is difficult for the occupant in the vehicle to hear.

Aspect 2 of this disclosure provides the vehicle door device according to Aspect 1, in which the transmission mechanism may include an abutment member that abuts on the power transmission member to bend the power transmission member.

According to the above configuration, the direction where the power transmission member extends can be randomly changed at the position where the abutment member abuts on the power transmission member. As a result, it is possible to freely set the transmission path of the drive torque easily with a simple configuration.

Aspect 3 of this disclosure provides the vehicle door device according to Aspect 1 or 2, in which the power transmission member may be a drive belt that is rotationally driven in a state of being wound around a pulley. That is, the drive belt transmits the drive torque in a bent state at the position wound around the pulley. Furthermore, the drive belt can be rotationally driven while maintaining the annular shape even in a twisted state. In other words, even in a case where a rotary shaft of each of the pulleys around which the drive belts are wound is in a "twisted positional relationship", the twist of the drive belts can absorb such a "twisted positional relationship". As a result, it is possible to freely set the drive torque transmission path formed by the drive belt extending between the actuator and the torque input portion. As a result, it is possible to ensure a high degree of freedom in the disposition of the actuator with a simple configuration while ensuring high reliability.

Aspect 4 of this disclosure provides the vehicle door device according to any one of Aspects 1 to 3, in which the transmission mechanism may be configured to allow a twisted positional relationship set between an output shaft of the actuator and a rotation shaft of the drive link pivoting due to an input of the drive torque.

According to the above configuration, it is possible to ensure a higher degree of freedom in the disposition of the actuators. Aspect 5 of this disclosure provides the vehicle door device according to any one of Aspects 1 to 4, in which the torque input portion may be supported by the vehicle body in a state of being held by a vehicle body bracket forming the first pivotal connection point, and the actuator may be supported by the vehicle body by being held by a holding bracket provided independently of the vehicle body bracket, in a state where an output shaft of the drive torque is disposed at a position separated from the torque input portion.

According to the above configuration, the actuator can be stably supported at a position separated from the rotation shaft of the drive link with respect to the vehicle body. As a result, the actuator can be easily disposed at an optimum position that does not interfere with getting on and off of the occupant through the door opening portion provided with the door device.

Aspect 6 of this disclosure provides the vehicle door device according to any one of Aspects 1 to 5, in which the actuator and the torque input portion may be disposed at positions that do not overlap with each other when viewed from above in a vehicle-mounted state.

According to this disclosure, the door of the vehicle can be preferably driven to open and close.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door device comprising:
first and second link arms each including a first pivotal connection point to a vehicle body and a second pivotal connection point to a door of a vehicle; and
a drive unit that opens and closes the door based on an operation of a link mechanism formed by the first and second link arms by using at least one of the first and second link arms as a drive link and pivoting the drive link, wherein
the drive unit includes
an actuator that outputs drive torque, and
a transmission mechanism that transmits the drive torque to the drive link disposed at a position separated from the actuator, and
the transmission mechanism includes
a torque input portion that inputs the drive torque to the drive link, and
a power transmission member that forms a transmission path for the drive torque in a state of extending between the actuator and the torque input portion and has flexibility to enable transmission of the drive torque in a bent state.

2. The vehicle door device according to claim 1, wherein the transmission mechanism includes an abutment member that abuts on the power transmission member to bend the power transmission member.

3. The vehicle door device according to claim 1, wherein the power transmission member is a drive belt that is rotationally driven in a state of being wound around a pulley.

4. The vehicle door device according to claim 1, wherein the transmission mechanism is configured to allow a twisted positional relationship set between an output shaft of the actuator and a rotation shaft of the drive link pivoting due to an input of the drive torque.

5. The vehicle door device according to claim 1, wherein the torque input portion is supported by the vehicle body in a state of being held by a vehicle body bracket forming the first pivotal connection point, and
the actuator is supported by the vehicle body by being held by a holding bracket provided independently of the vehicle body bracket, in a state where an output shaft of the drive torque is disposed at a position separated from the torque input portion.

6. The vehicle door device according to claim 1, wherein the actuator and the torque input portion are disposed at positions that do not overlap with each other when viewed from above in a vehicle-mounted state.

7. The vehicle door device according to claim 2, wherein the power transmission member is a drive belt that is rotationally driven in a state of being wound around a pulley.

8. The vehicle door device according to claim 2, wherein the transmission mechanism is configured to allow a twisted positional relationship set between an output shaft of the actuator and a rotation shaft of the drive link pivoting due to an input of the drive torque.

9. The vehicle door device according to claim 2, wherein the torque input portion is supported by the vehicle body in a state of being held by a vehicle body bracket forming the first pivotal connection point, and
the actuator is supported by the vehicle body by being held by a holding bracket provided independently of the vehicle body bracket, in a state where an output shaft of the drive torque is disposed at a position separated from the torque input portion.

10. The vehicle door device according to claim 2, wherein the actuator and the torque input portion are disposed at positions that do not overlap with each other when viewed from above in a vehicle-mounted state.

* * * * *